United States Patent
Long et al.

(10) Patent No.: US 8,816,557 B2
(45) Date of Patent: Aug. 26, 2014

(54) DYNAMOELECTRIC DEVICE

(75) Inventors: John D Long, Knoxvill, TN (US); David R Vaden, Knoxville, TN (US); Craig B Rutherford, Harriman, TN (US)

(73) Assignee: Electric Gorilla, LLC, San Francisco, CA (US)

(*) Notice: Subject to any disclaimer, the term of this patent is extended or adjusted under 35 U.S.C. 154(b) by 507 days.

(21) Appl. No.: 12/941,059

(22) Filed: Nov. 7, 2010

(65) Prior Publication Data

US 2011/0273052 A1  Nov. 10, 2011

Related U.S. Application Data

(60) Provisional application No. 61/258,921, filed on Nov. 6, 2009.

(51) Int. Cl.
*H02K 3/04* (2006.01)
*H02K 3/46* (2006.01)
*H02K 21/14* (2006.01)
*H02K 57/00* (2006.01)

(52) U.S. Cl.
USPC ..... 310/194; 310/36; 310/156.38; 310/254.1; 310/208

(58) Field of Classification Search
USPC ............. 310/36, 156.38, 208, 10, 64, 156.01, 310/194; 901/18, 38; 74/5.47
See application file for complete search history.

(56) References Cited

U.S. PATENT DOCUMENTS

| | | | |
|---|---|---|---|
| 381,968 A | 5/1888 | Tesla | |
| 390,415 A | 10/1888 | Tesla | |
| 1,687,039 A * | 10/1928 | Romp | 310/157 |
| 3,045,132 A | 7/1962 | Yeoman | |
| 3,259,864 A | 7/1966 | Marzolf et al. | |
| 3,339,097 A | 8/1967 | Dunn | |
| 3,585,450 A | 6/1971 | Lane | |
| 3,609,427 A | 9/1971 | Lautner et al. | |
| 3,739,312 A | 6/1973 | Knebel | |
| 3,974,406 A | 8/1976 | Wehde | |
| 4,112,405 A | 9/1978 | Joseph | |
| 4,130,769 A | 12/1978 | Karube | |
| 4,132,913 A | 1/1979 | Lautner et al. | |
| 4,227,164 A | 10/1980 | Kitahara | |
| 4,337,405 A | 6/1982 | Hishida | |
| 4,424,505 A | 1/1984 | Yatsushiro et al. | |
| 4,516,044 A * | 5/1985 | Bone | 310/64 |
| 4,795,929 A | 1/1989 | Elgass et al. | |
| 4,818,911 A | 4/1989 | Taguchi et al. | |
| 4,883,981 A | 11/1989 | Gerfast | |
| 4,895,495 A | 1/1990 | Arai | |
| 5,525,850 A | 6/1996 | Stinson | |
| 5,532,532 A * | 7/1996 | DeVault et al. | 310/52 |

(Continued)

FOREIGN PATENT DOCUMENTS

| | | | | |
|---|---|---|---|---|
| DE | 3108959 | * | 10/1982 | H02K 23/00 |
| DE | 3128 220 | * | 2/1983 | H02K 37/00 |

(Continued)

*Primary Examiner* — Burton Mullins
(74) *Attorney, Agent, or Firm* — DLA Piper LLP (US)

(57) ABSTRACT

A device, including a rotor, a stator, a coil wound around the stator, wherein the stator has a coil support structure having at least one side edge arranged along a line which is not parallel to a line extending from an axis of the rotor through a center of the coil.

20 Claims, 29 Drawing Sheets

(56) References Cited

U.S. PATENT DOCUMENTS

| | | | |
|---|---|---|---|
| 5,600,294 A | 2/1997 | Buenconsejo et al. | |
| 5,668,423 A * | 9/1997 | You et al. | 310/81 |
| 5,672,924 A * | 9/1997 | Wallace et al. | 310/152 |
| 6,091,590 A | 7/2000 | Sakamoto | |
| 6,166,468 A * | 12/2000 | Suzuki et al. | 310/90 |
| 6,481,089 B1 * | 11/2002 | Enomoto et al. | 29/596 |
| 6,583,532 B2 | 6/2003 | Hein et al. | |
| 6,587,024 B2 | 7/2003 | Matsumoto | |
| 6,834,561 B2 * | 12/2004 | Meffe | 74/5.46 |
| 6,879,076 B2 * | 4/2005 | Long | 310/156.38 |
| 6,975,050 B2 | 12/2005 | Cleanthous et al. | |
| 7,017,851 B2 | 3/2006 | Matsuura et al. | |
| 7,102,258 B2 * | 9/2006 | Shen | 310/50 |
| 7,132,774 B2 | 11/2006 | Suzuki | |
| 7,145,280 B2 * | 12/2006 | Noble et al. | 310/254.1 |
| 7,211,919 B2 | 5/2007 | Kalsi et a | |
| 7,289,012 B2 | 10/2007 | Tran-Ngoc et al. | |
| 7,350,607 B2 | 4/2008 | Park et al. | |
| 7,394,165 B2 | 7/2008 | Schiller | |
| 8,080,911 B2 * | 12/2011 | Won et al. | 310/80 |
| 2007/0120432 A1 | 5/2007 | Vaden et al. | |
| 2007/0210659 A1 | 9/2007 | Long | |

FOREIGN PATENT DOCUMENTS

| | | | | |
|---|---|---|---|---|
| FR | 2571558 | * | 4/1986 | H02K 1/16 |
| FR | 2928423 A1 | * | 9/2009 | H02K 35/04 |
| JP | 62-221856 | * | 9/1987 | H02K 33/16 |
| JP | 08275472 A | * | 10/1996 | H02K 16/00 |
| JP | 2003-324936 | * | 11/2003 | H02K 57/00 |

* cited by examiner

POWER FLOW DIAGRAM: REMOVABLE
INTEGRATED GENERATOR/ENERGY STORAGE

POWER FLOW DIAGRAM: FIXED
GENERATOR REMOVABLE ENERGY STORAGE

_DYNAMOELECTRIC DEVICE_

RELATED APPLICATION

This application claims priority from U.S. Provisional Application No. 61/258.921 filed Nov. 6, 2009 the disclosure of which is incorporated by reference.

FIELD OF THE INVENTION

The present invention relates generally to dynamoelectric devices.

BACKGROUND OF THE INVENTION

Dynamoelectric devices include among other things electric generators, alternators, actuators, and motors. An electric generator is a device that converts mechanical energy to electrical energy. In contrast an electrical motor converts electrical energy to mechanical energy. A typical electrical generator includes a stationary structure referred to as the stator, and a rotating part referred to as the rotor. Typically the rotor includes permanent magnets or electro magnets that are designed to rotate relative to a coil that is wound around the stator. The motion of the magnets relative to the coil produces electrical current in the coil. The current producing coil is also called an armature. Optionally, the armature may be placed on the rotor with the magnets on the stator instead of the opposite situation described above.

The current flowing in the coil produces heat, which also increases the resistance of the coil and reduces the effectiveness of the dynamoelectric device. There is thus an interest in lowering the heat buildup in the coil during operation of generators and other dynamoelectric devices.

SUMMARY OF THE INVENTION

An aspect of an embodiment of the invention, relates to a device including a rotor, a stator with a coil support structure to support a coil, a coil wound around the stator support structure, wherein the coil support structure is designed to enlarge the exterior surface of the coil to improve heat dissipation. Optionally, the coil support structure has at least one edge for supporting the coil that is beveled or extends in a direction that is not parallel to a line extending from an axis of the rotor through a center of the coil.

In an exemplary embodiment of the invention, the stator surrounds the rotor and allows the rotor to produce electrical current in the coil by rotating relative to the stator. Optionally, a cross section of the coil forms a trapezoid or a triangle. In an exemplary embodiment of the invention, the rotor is shaped as a circle or ellipsoid.

There is thus provided according to an exemplary embodiment of the invention, a device, comprising:
a rotor;
a stator;
a coil wound around the stator;
wherein the stator has a coil support structure having at least one side edge arranged along a line which is not parallel to a line extending from an axis of the rotor through a center of the coil.

In an exemplary embodiment of the invention, the stator defines a cavity in which the rotor is disposed, wherein the stator supports the rotor for rotation about the axis. Optionally, the rotor is an ellipsoidal rotor. In an exemplary embodiment of the invention, the rotor includes a plurality of magnetic poles. Optionally, the stator is an ironless stator. In an exemplary embodiment of the invention, the coil support structure is made of a magnetically and electrically non-conductive material, selected from the group consisting of a glass-filled epoxy, a glass-filled plastic, a mineral-filled epoxy, a mineral-filled plastic, and a combination thereof. Optionally, the coil support structure is made of a magnetically and electrically conductive material, selected from the group consisting of powdered metal filled epoxy, powdered metal filled plastic, sintered powdered metal, and a laminated iron core. In an exemplary embodiment of the invention, the rotor includes a spherical magnet. Optionally, the rotor includes a supporting shaft for rotation about an axis.

In an exemplary embodiment of the invention, the coil support structure includes a housing surrounding the rotor with a substantially solid cavity wall. Optionally, the coil support structure includes a housing having a plurality of fins that define one side edge and a plurality of fins that define another side edge. In an exemplary embodiment of the invention, the coil support structure includes a first wall that defines one side edge and a second wall that defines another side edge. Optionally, the first wall and the second wall are both solid walls. In an exemplary embodiment of the invention, the coil support structure includes a plurality of fins integrally made with the first wall and a plurality of fins integrally made with the second wall. Optionally, a space for the coil in the coil support structure is narrower radially inwardly than radially outwardly.

In an exemplary embodiment of the invention, the coil support structure is made of two complementary members, a first member from the two complementary members includes one side edge and a second member from the two complementary members includes another side edge. Optionally, the coil support structure includes a wall that divides the coil support structure, a first portion of the wall being associated with the first member from the two complementary members and a second portion of the wall being associated with the second member from the two complementary members. In an exemplary embodiment of the invention, the rotor includes a plurality of magnetic poles even in number, and the coil support structure defines a first path for the coil and a second path for the coil different from the first path, the second path having a first beveled side and a second beveled side and located about an outer perimeter of the cavity. Optionally, an electrical conductor of the coil wound within the first path and an electrical conductor of the coil wound within the second path are a single electrical conductor. In an exemplary embodiment of the invention, the coil support includes a housing surrounding the rotor with a plurality of fins.

There is further provided according to an exemplary embodiment of the invention, a device, comprising:
a rotor; and
a stator having a housing, a first portion of the housing defining a cavity in which the rotor is disposed, a second portion of the housing defining a path within which to wind an electrical conductor, the path having a first beveled side and a second beveled side and located about an outer perimeter of the cavity;
wherein the rotor is configured to be held stationary and the stator is configured to rotate about the rotor.

Additionally, there is further provided according to an exemplary embodiment of the invention, a device, comprising:
a stator having a coil and a housing defining an ellipsoidal path within which the coil is wound, the ellipsoidal path having a first beveled side and a second beveled side; and
a rotor disposed external to the stator.

In an exemplary embodiment of the invention, the rotor is a first rotor, the device further comprising:
  a second rotor coupled to the first rotor;
  wherein the housing of the stator defines a cavity within which the second rotor is disposed and supported to rotate about an axis common to the first rotor.

Optionally, the first rotor and the second rotor are magnetically coupled. In an exemplary embodiment of the invention, the second rotor is a sphere including iron. Optionally, the second rotor is a spherical magnet.

Additionally, there is further provided according to an exemplary embodiment of the invention, a device, comprising:
  a rotor; and
  a stator having a plurality of winding housings, a first portion of the housings defining a cavity in which the rotor is disposed and supported to rotate about an axis, a second portion of the housings defining a plurality of paths within each of which one of the windings is wound, each path having a first beveled side and a second beveled side and located about an outer perimeter of the cavity, each path being angularly offset from another path by a predetermined rotation angle.

Optionally, the rotor is a two-magnetic-pole spherical rotor.

Additionally, there is further provided according to an exemplary embodiment of the invention, a device, comprising:
  a rotor; and
  a stator including a plurality of one-half turn elements.

Optionally, the rotor is internal to the one-half turn elements. In an exemplary embodiment of the invention, the rotor is external to the one-half turn elements. Optionally, the device further comprising an internal rotor, internal to the one-half turn elements. In an exemplary embodiment of the invention, each one-half turn element has a trapezoidal cross-section. Optionally, the device further comprising a shorting ring electrically connecting one of the ends of the plurality of one-half turn elements. In an exemplary embodiment of the invention, the device, further comprising a plurality of jumper conductors to connect multiple one-half turn elements to form one or more multiple turn phases.

Additionally, there is further provided according to an exemplary embodiment of the invention, a device, comprising:
  a rotational power source; and
  a drive disk connected to the power source; and
  a generator;
  wherein the generator stator is held fixed and connected to the ground of the device and the generator rotor is coupled to the drive disk by means of a friction roller Optionally, the device further comprising a removable energy storage system for the simple transport of energy generated by the device. In an exemplary embodiment of the invention, the generator is a dynamoelectric device and the removable energy storage system includes a power conditioning circuit and a battery. Optionally, the generator is a dynamoelectric device and the removable energy storage system includes a power conditioning circuit and a capacitor.

In an exemplary embodiment of the invention, the generator is a pneumatic or hydraulic device and the removable energy storage system includes an accumulator with attached closure valve and quick disconnect. Optionally, the generator is coupled to the friction roller through means of a flexible drive shaft. In an exemplary embodiment of the invention, the friction roller can be selectively engaged or disengaged from the drive disk by means of a lever and cable controlled caliper system by the operator. Optionally, the friction roller can be selectively engaged or disengaged from the drive disk by means of a lever and piston hydraulic caliper system by the operator. In an exemplary embodiment of the invention, a dynamoelectric generator is used and the energy generated by the generator is controlled to be proportional to the position or pressure on the lever system by pulse width modulation or other electronic means.

Additionally, there is further provided according to an exemplary embodiment of the invention, a device, comprising:
  a rotational power source;
  an energy storage system;
  a generator including a stator and a rotor; and
  wherein the rotational power source is coupled to the rotor to generate electrical power and wherein the electrical power is stored in the energy storage system, so that it can be utilized to power an external device.

In an exemplary embodiment of the invention, the energy storage system is removable. Optionally, the energy storage system includes an interface adapted to accept a cable for providing power to the external device. In an exemplary embodiment of the invention, the device includes a magnetic or mechanical coupling allowing removal of the generator for other uses. Optionally, the device includes a gear-set to modify the speed of the generator relative to the rotational power source. In an exemplary embodiment of the invention, the device includes a power conditioning circuit for the purpose of controlled charge and discharge of the energy storage system. Optionally, the device is adapted to enable the recovery of energy generated by human powered motion of parcels, carts, luggage, computer bags, or other pushed or pulled devices. Alternatively or additionally, the device is adapted to enable the recovery of energy generated by burning of fuel in an engine. Further alternatively or additionally, the device is adapted to enable the recovery of wind or water energy.

Additionally, there is further provided according to an exemplary embodiment of the invention, a device, comprising:
  a rotor;
  a stator encasing the rotor;
  a coil wound around the stator forming an interior surface near the rotor and an exterior surface facing out of the device;
  wherein the stator has a coil support structure guiding the coil that is designed to enlarge the size of the exterior surface of the coil relative to the size of the interior surface of the coil.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

The disclosure describes various dynamoelectric devices having air-core stators in which the coils have side edges which are splayed or beveled. The splay enables a reduction in the thermal conductive resistance of the shortest thermal dissipation path, that is, the path through the thickness of the winding along a radially outward direction. In several of these designs, a brush-less stator having a bobbin-type, axial-centered coil conductor provides a total capture of magnetic flux emanating from a rotor having an entire surface area of uniform flux density.

Typically, bobbin-type stator structures have been used in a number of dynamoelectric devices such as alternators, generators, motors, and actuators, for example. The rotors used with such bobbin-type stator structures can include permanent magnet cylinders, discs, truncated spheres, and spherical shapes having selectable numbers of poles, for example. Also, electromagnetic rotors can be used.

Applications using the types of structures described briefly above include mobile generating application in devices such as luggage, carts, or bicycles as well as stationary applications such as wind or water driven power generation. The embodiments herein offer improved heat dissipation, power density and ease of manufacture over prior embodiments. Additionally, embodiments described herein offer the additional utility of increased modularity of the generator and energy storage over prior art. This allows portability of the energy production and storage portions of the system for use with other devices.

Although the embodiments are described below in the context of generators, the embodiments described below can also be employed as other dynamoelectric devices such as motors, alternators, or actuators, for example.

In the description provided below the terms rotor and stator may be interchangeable as one or the other (or both) may rotate. Also, the rotor can be an internal rotor or an external rotor even when a particular embodiment or example is described showing only one or the other.

Figure 1:
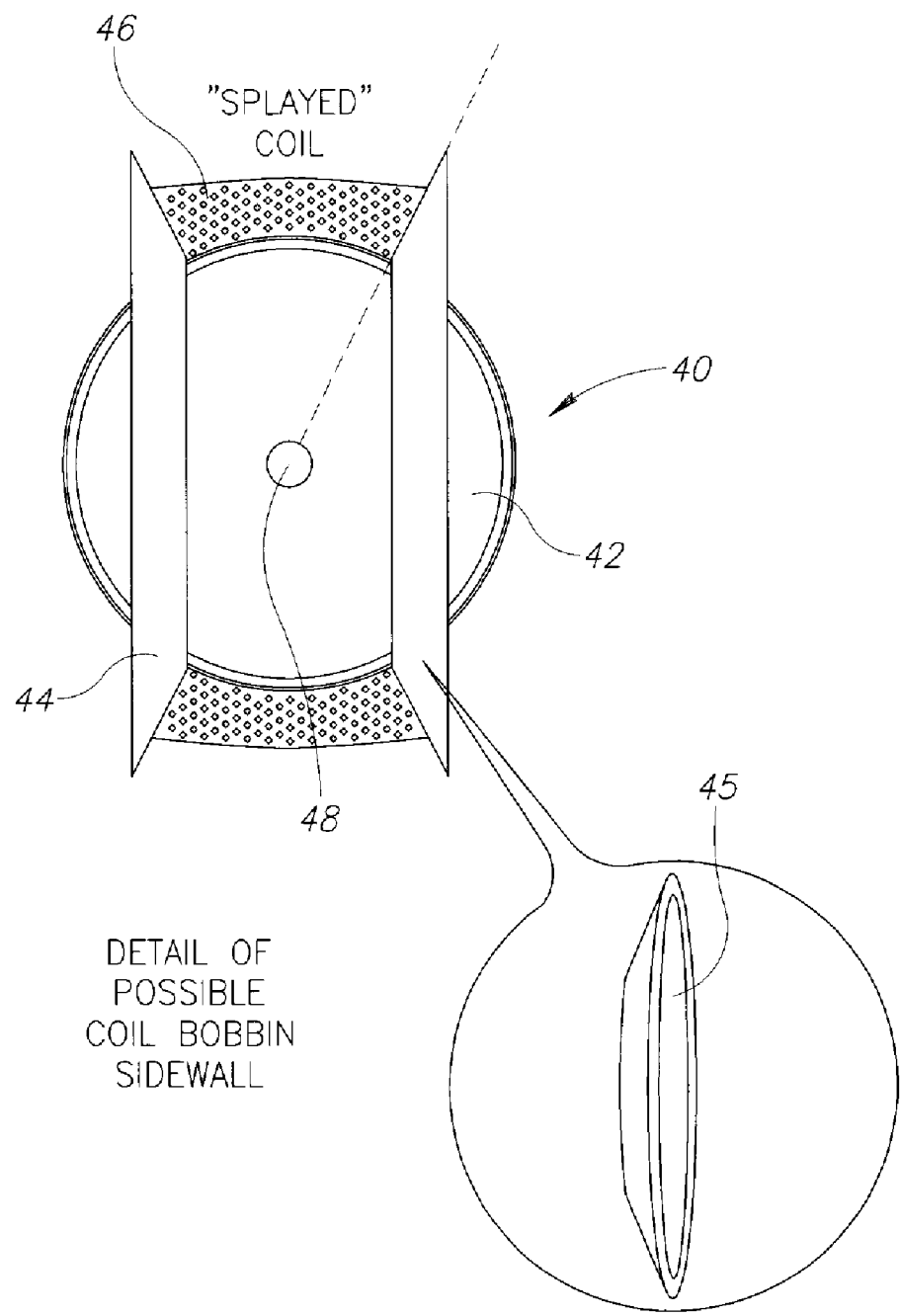
FIG. 1 is a cross-sectional view of a generator with an expanded view of a splayed coil bobbin sidewall, according to an exemplary embodiment of the invention.

FIG. 1 shows a cross-sectional view of a generator 40 including a rotor 42 and a coil bobbin 44 and a stator coil 46. In this example, a 1 inch (in.) spherical rotor 42 can be used with a stator coil 46 having a base width of about 0.5 in. The sidewalls 45 of bobbin 44 extend along a radial line drawn through the original base dimension and intersecting the shaft 48 of the rotor 42. The sidewalls 45, although splayed or beveled, need not extend along a radial line passing through shaft 48.

Figure 2:
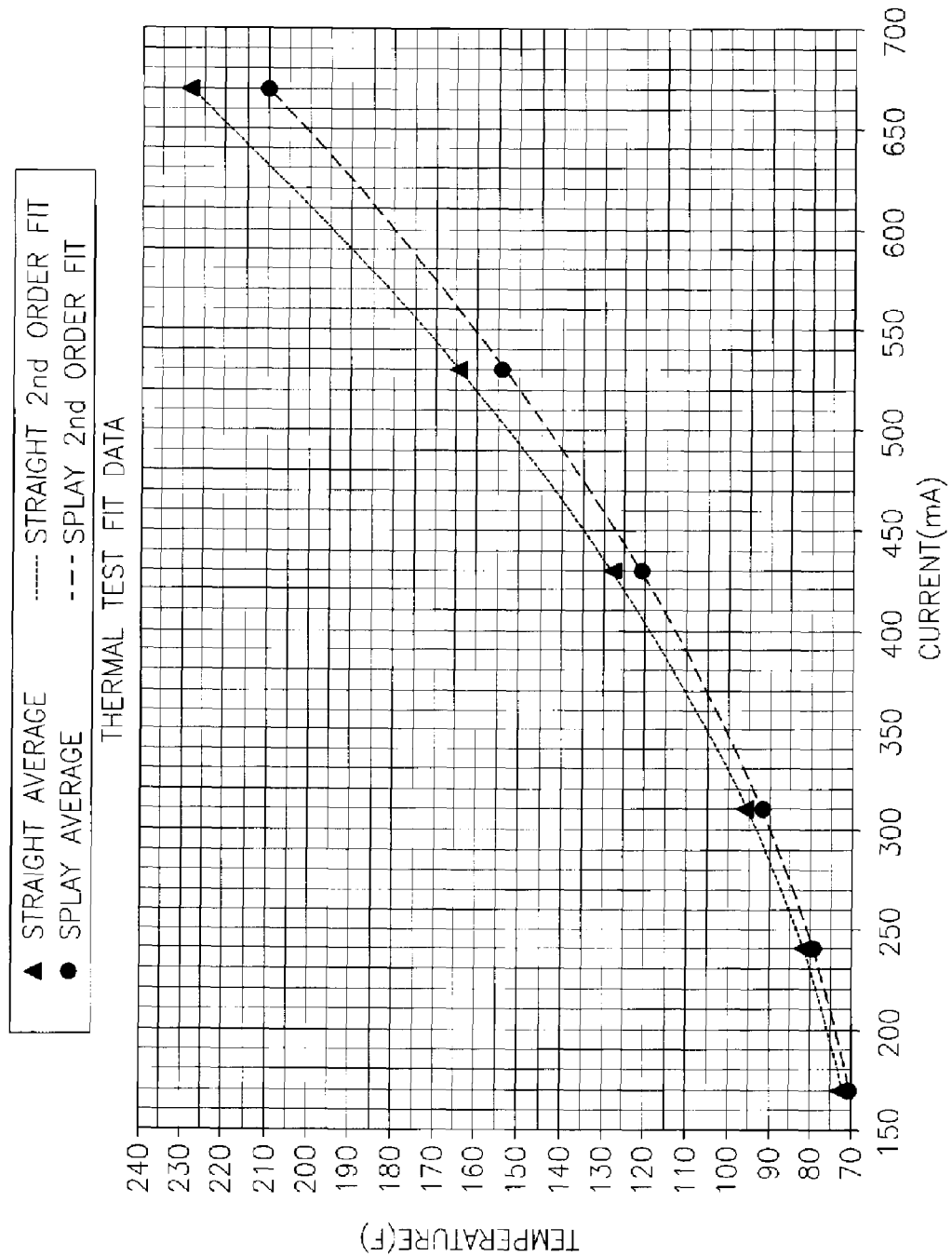
FIG. 2 is a chart illustrating thermal test results for flare or splayed sidewalls, according to an exemplary embodiment of the invention.

The splayed-coil configuration shown in FIG. 1 allows improved thermal dissipation over a straight-walled bobbin because of the improved thermal conductance to the outer surface. Free convection continuous current operating temperatures at the coil center at the inner diameter (ID) are shown in FIG. 2. While not shown, it is anticipated that forced convection can result in even greater improvement in thermal dissipation of the splayed-coil configuration because of the increased surface area. FIG. 2 shows results for a straight-coil and for a splayed-coil configuration.

The magnet of the rotor is magnetized in such a manner that a plane defining the pole boundary of the magnet coincides with a plane drawn through the centerline of the coil 46 at some point during a 360 degree rotation of the rotor.

In this embodiment and the other embodiments described herein, the bobbin can be made of an electrically non-conductive material. The electrically non-conductive material of the housing can have high thermal conductivity, such as glass or mineral filled epoxy or plastic, for example. The bobbin housing can be injection molded or cast but alternatively, the bobbing housing can be machined from a block of material, In this and other embodiments, in addition to performing the function of mechanical support of the stator winding, the bobbin housing can also provide the bearing support of the shaft of the rotor. This can be performed through a molded-in bushing type of support of either the same material of the bobbin housing, or of a metal or other material intended for extended bearing life such as an oil impregnated bronze bushing or a Teflon bushing.

Alternatively, the bobbin housing can be a support structure for a roller or ball bearing assembly intended to support the shaft of the rotor. In some embodiments, where the magnetic rotor is magnetically coupled to an external rotating magnetic field, the bearing supports need not be used and the interior or inner diameter of the bobbin housing can be used as the bearing and/or wear surface of the rotor. Such approach may be particularly feasible in light load and/or low speed operation. A low friction material may be used for the bobbin housing or applied following manufacture of the bobbin housing.

In this and other embodiments, the wire used to construct the stator coil can be a standard, single strand individually insulated wire of a type used in electric motor windings or other suitable types. An overcoat of varnish or epoxy over the finished winding can be used to provide mechanical support and vibration resistance while improving thermal conductivity by displacing entrapped air. Alternatively, the wire can be used with a bondable coating to provide the mechanical support afforded by a varnish or epoxy overcoat. When a bondable coating is used, the winding can be bonded by heating the entire assembly in an oven or through heating the winding by current flow through the winding. Alternatively the varnish, epoxy, or bondable overcoat may be omitted. As an alternative to the single strand winding, the stator can also be constructed with multiple wires "in-hand" to reduce the level of eddy currents induced in the wire at operating speed. These wires may be randomly spaced "in-hand" wires or bundled wires with or without an additional external insulator. Additionally, when bundled, the bundled wire or coil can be constructed with a repeating twist of some length to reduce high frequency losses, such as it is done in a Litz wire construction, for example.

In operation as a generator, rotor 42 can be rotated. Rotation of rotor 42 induces a voltage in coil 46.

FIGS. 3-11c describe several embodiments of splayed-coil stator bobbin configurations for use in dynamoelectric devices, such as generators, with 2-pole spherical rotors. These embodiments can be used, with or without modification, to support higher pole counts and/or non-spherical rotors.

Figure 3:
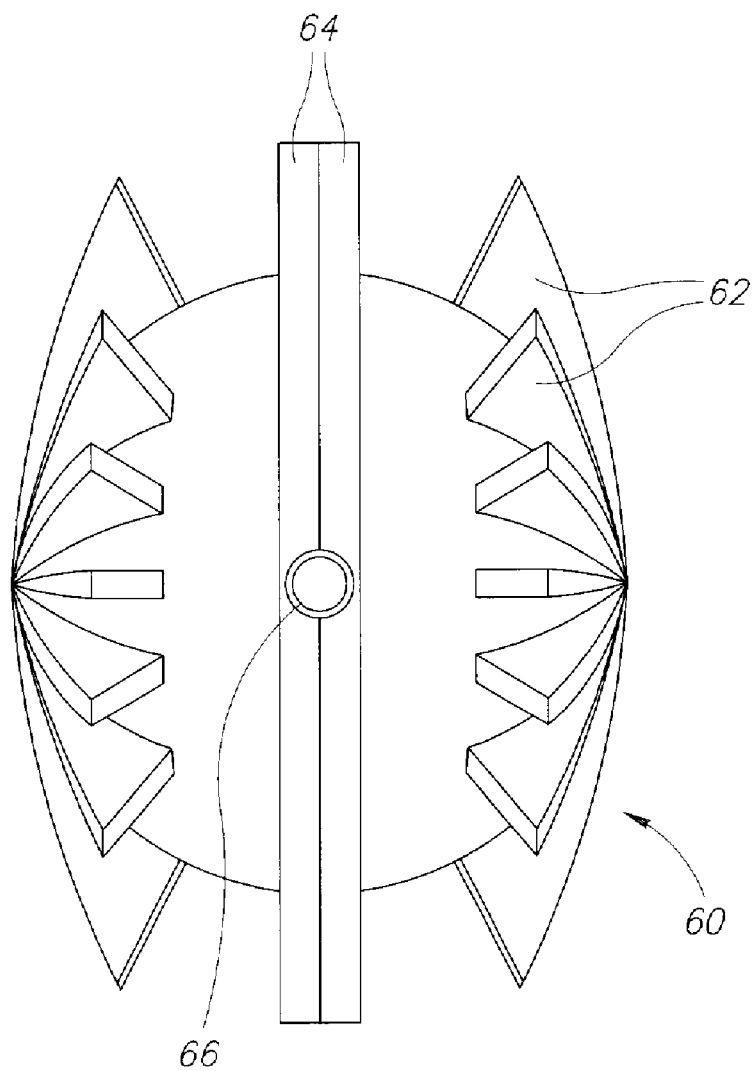
FIG. 3 is a top view of a generator configured to produce a splayed coil configuration by a fin-formed splay, according to an exemplary embodiment of the invention.

FIG. 3 is a top view of a stator bobbin 60 of a generator configured to produce a splayed-coil configuration for a coil bundle by a splay formed by fins 62, according to an embodiment. The stator 60 is shown having a center wall 64 formed when both complementary portions of the stator bobbin 60 are brought together. Also shown is an opening 66 for a shaft connected to a rotor (not shown) disposed within the stator bobbin 60. The stator coil (not shown) is wound between fins 62 and center wall 64.

Figure 4:
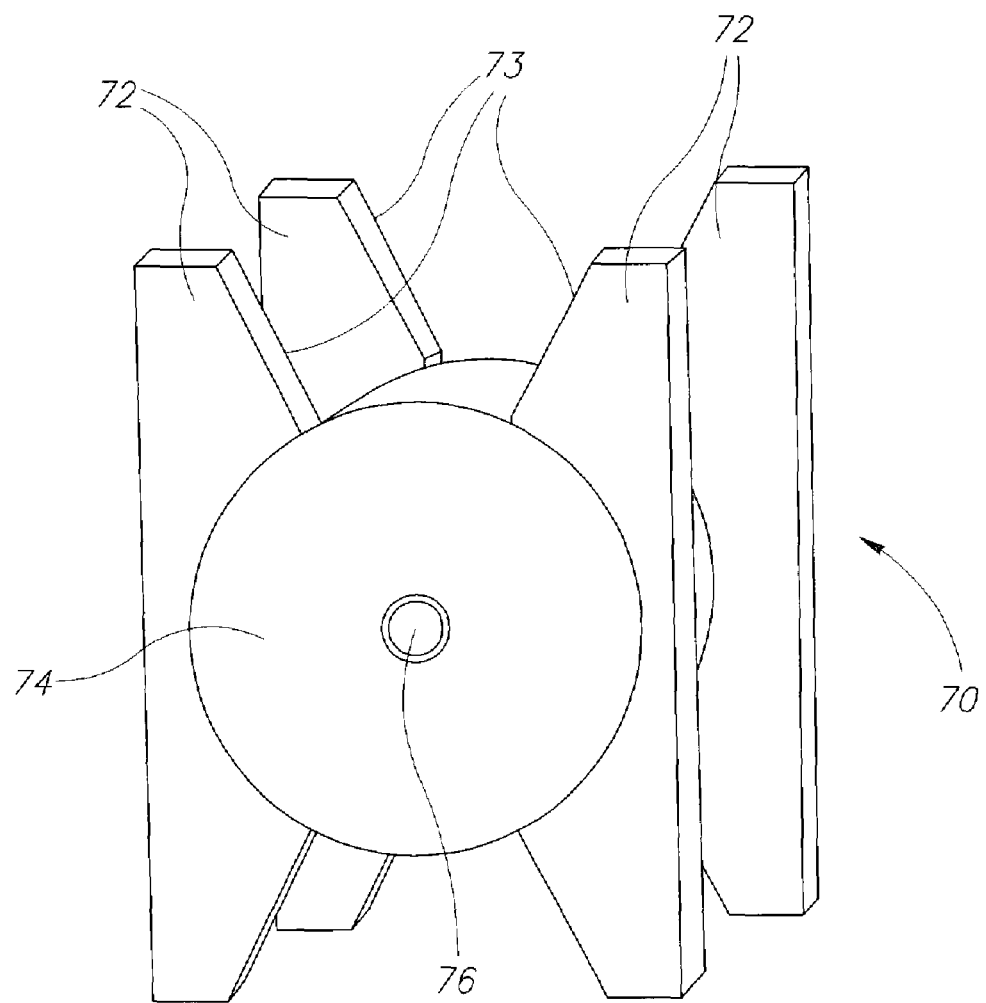
FIG. 4 is a perspective view of a generator with a cylinder shaped coil, according to an exemplary embodiment of the invention.

FIG. 4 is a perspective view of a stator bobbin 70 for a generator with a cylinder-shaped coil, according to an embodiment. The stator bobbin 70 is shown having a cylindrical housing 74 for a rotor (not shown). Also shown is an opening 76 for a shaft connected to the rotor (not shown) and members 72 to form the splay for the coil bundle. In this embodiment, the stator coil is wound around the stator bobbin 70 as guided by sloping edges 73 of members 72 to form a splayed stator coil. The rotor associated with stator bobbin 70 and corresponding stator coil is a cylindrical magnet with the boundary between opposing poles lies in a plane drawn longitudinally through the axis of the shaft and shaft opening 76 and passing through the centerline of stator coil associated with 70 at some point during 360 degree rotation of the rotor.

Figure 5:
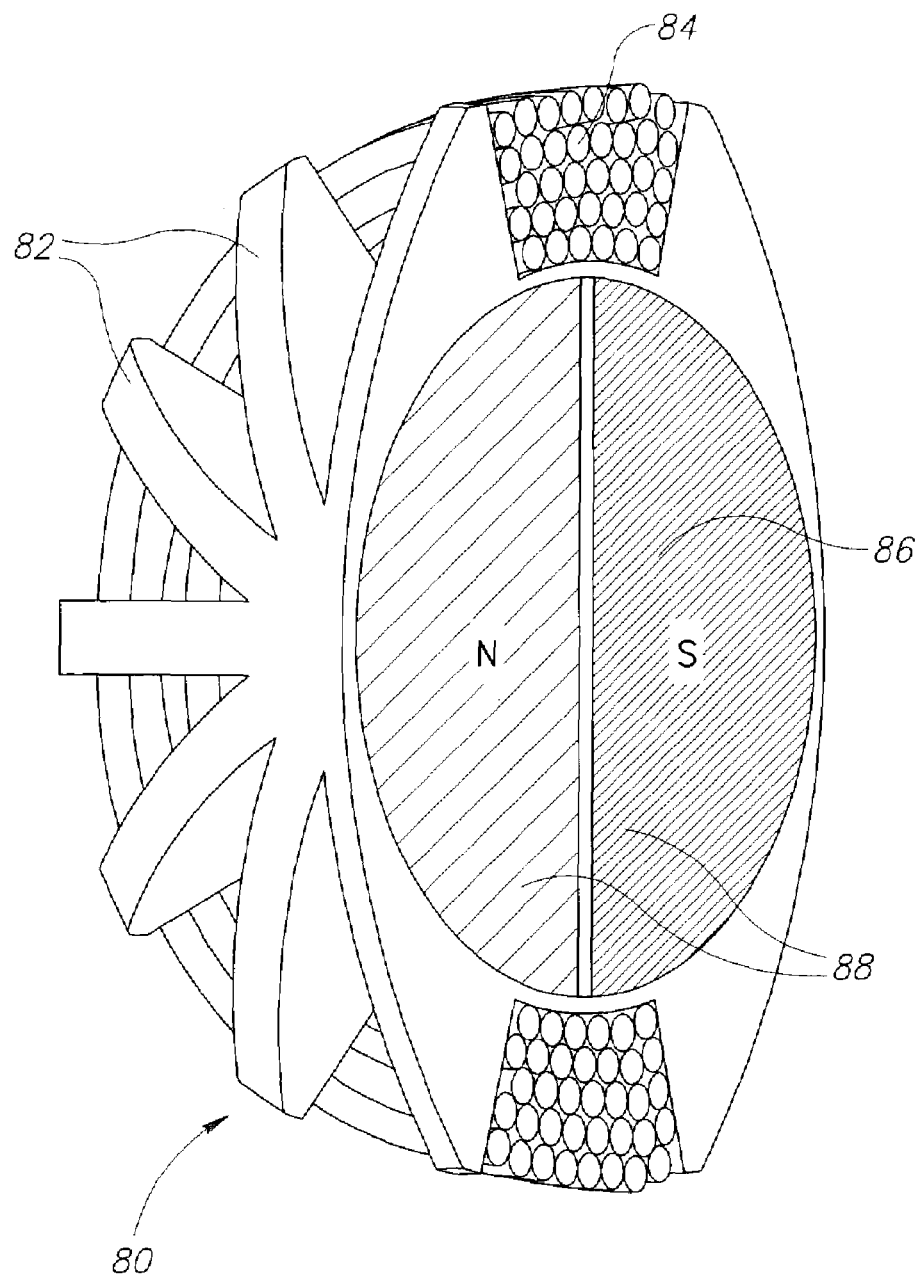
FIG. 5 is a perspective view of a cross section of a generator having a splayed coil and showing the rotor with rotor poles labeled, according to an exemplary embodiment of the invention.

FIG. 5 is a perspective view of a cross section of a generator 80 having a splayed coil 84 and showing a rotor 86 with rotor poles 88 labeled, according to an embodiment. The stator bobbin of the generator 80 includes fins 82 to form the splay for the coil bundle. To generate a voltage in coil 84, rotor 86 is rotated about an axis in the plane between the poles and perpendicular to the cross-sectional face.

Figure 6A:
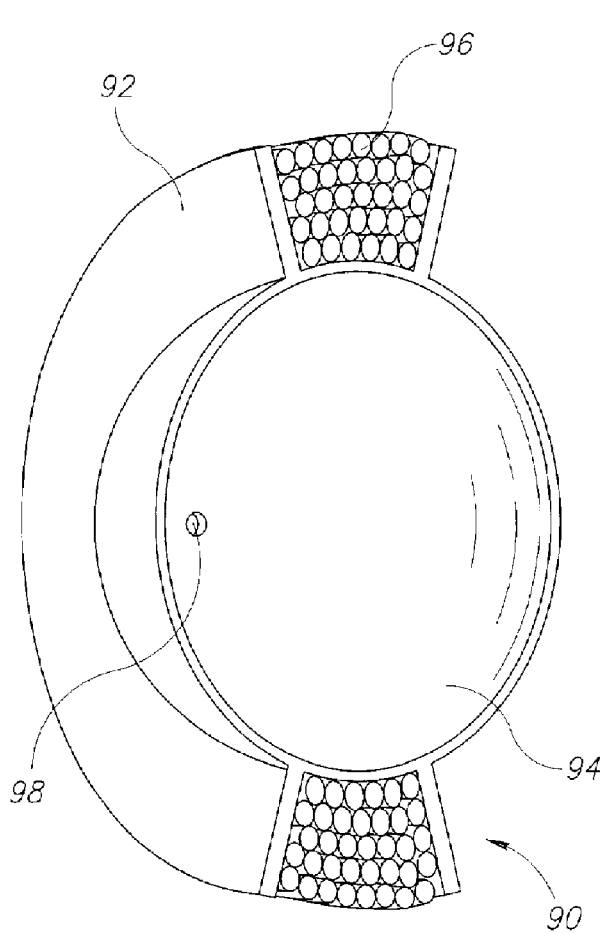
FIGS. 6a-6c illustrate views of a generator with a splayed coil configuration, solid sidewalls, and a solid inner surface, according to an exemplary embodiment of the invention.
Figure 6B:
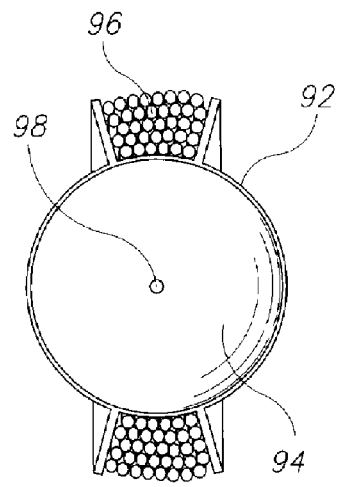
Figure 6C:
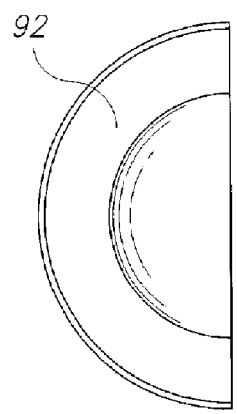

FIGS. 6a-6c illustrate views of a generator rotator 90 with a splayed-coil configuration. Stator 90 includes a solid inner surface 94 that would be proximate to a rotor (not shown). Coil 96 is supported in a splayed configuration by solid sidewalls 92. In this embodiment, the bobbin housing of stator 90 is made in two pieces of, for example, an electrically non-conductive material. The multi-turn toroidally wound electrical winding 96 is wound over the two-piece bobbin housing after the housing is assembled around the rotor (not shown). The rotor can include a spherical magnet and a supporting shaft that passes through holes 98 in inner surface 94. The magnet of the rotor is magnetized in such a manner that a plane defining the pole boundary of the magnet, a plane drawn through the centerline of the corresponding coil 96 at some point during a 360 degree rotation of the rotor.

Figure 7A:
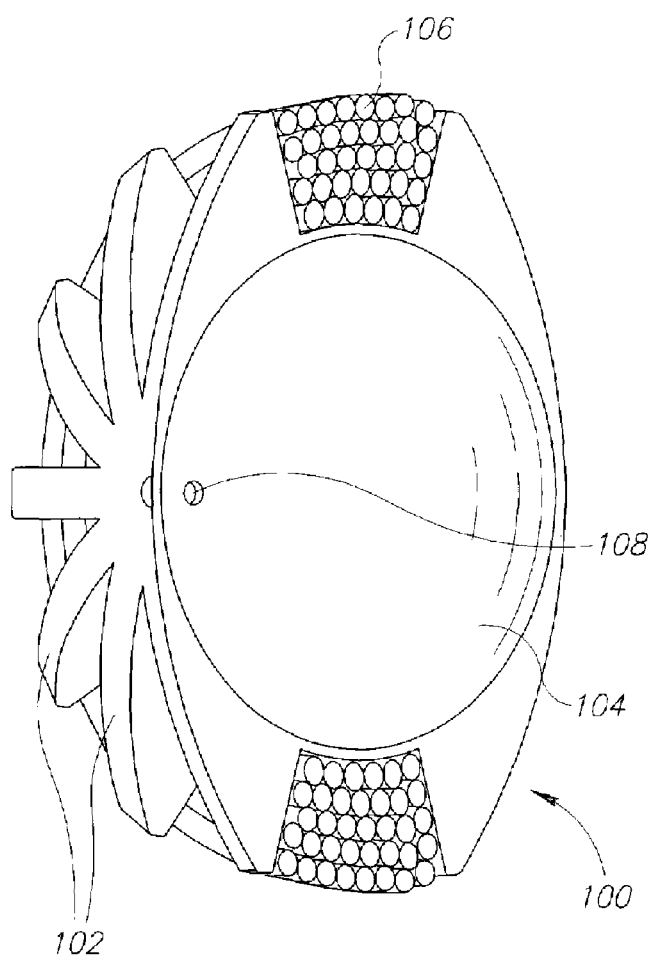
FIGS. 7a-7c illustrate views of a generator with a splayed coil configuration, finned sidewalls and a solid inner surface, according to an exemplary embodiment of the invention.
Figure 7B:
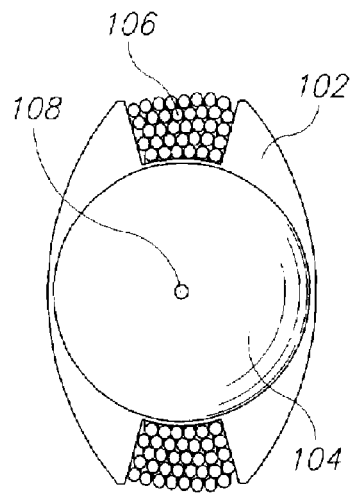
Figure 7C:
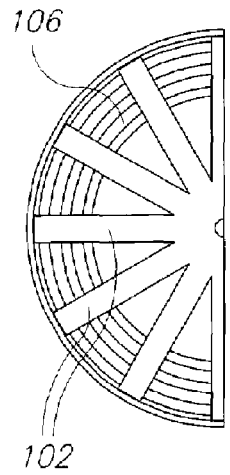

FIGS. 7a-7c illustrate views of generator stator 100 with a splayed-coil configuration. The stator bobbin includes finned sidewalls 102 and a solid inner surface 104. In this embodiment, the materials and processes used can be the same or substantially the same as those described above. Moreover, temporary winding supports may be used to support the stator windings 106 during the bonding or varnish/epoxy application phase of construction to decrease the amount of entrapped air in the stator winding 106 and achieve a corresponding increase in the thermal conductivity of the stator winding 106. Holes 108 are provided for a shaft for a rotor (not shown). The magnet of the rotor is magnetized in such a manner that a plane defining the pole boundary of the magnet, a plane drawn through the centerline of the corresponding coil 106 at some point during a 360 degree rotation of the rotor.

Figure 8A:
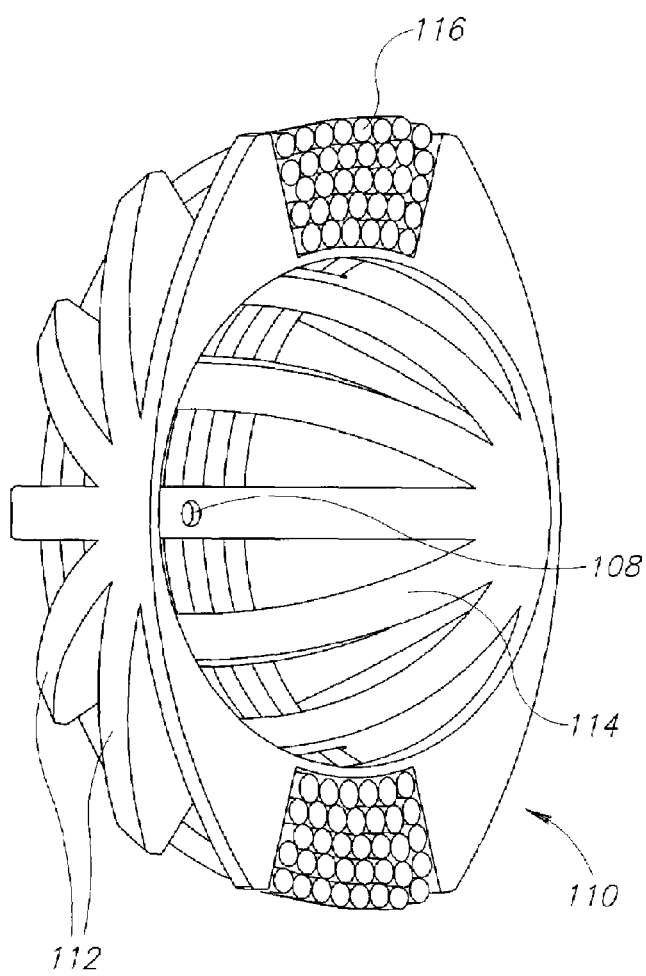
FIGS. 8a-8c illustrate views of a generator with a splayed coil configuration, finned sidewalls, and a finned inner surface, according to an exemplary embodiment of the invention.
Figure 8B:
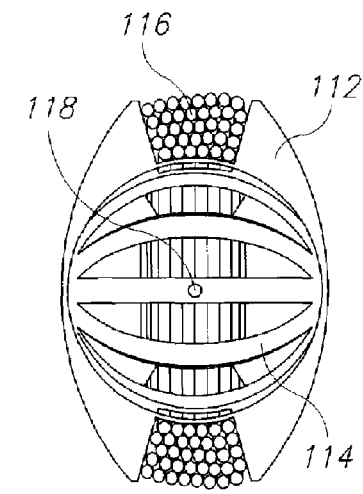
Figure 8C:
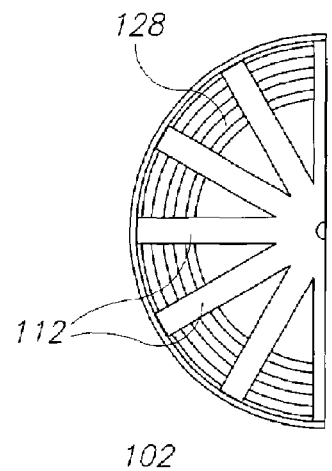

FIGS. 8a-8c illustrate views of a generator stator 110 with a splayed-coil configuration. The stator bobbin includes finned sidewalls 112, and a finned inner surface 114. In this embodiment, the materials and processes used can be the same or substantially the same as those described above.

Alternatively, the surface of the magnet used in the rotor can have a raised pattern or increased roughness to increase the amount of air moved by the rotor with a corresponding increase in the convection coefficient related to the thermal dissipation of the conductors of the stator winding 116. Holes 118 are provided for a shaft for a rotor (not shown). The magnet of the rotor is magnetized in such a manner that a plane defining the pole boundary of the magnet, a plane drawn through the centerline of the corresponding coil 116 at some point during a 360 degree rotation of the rotor.

Figure 9A:
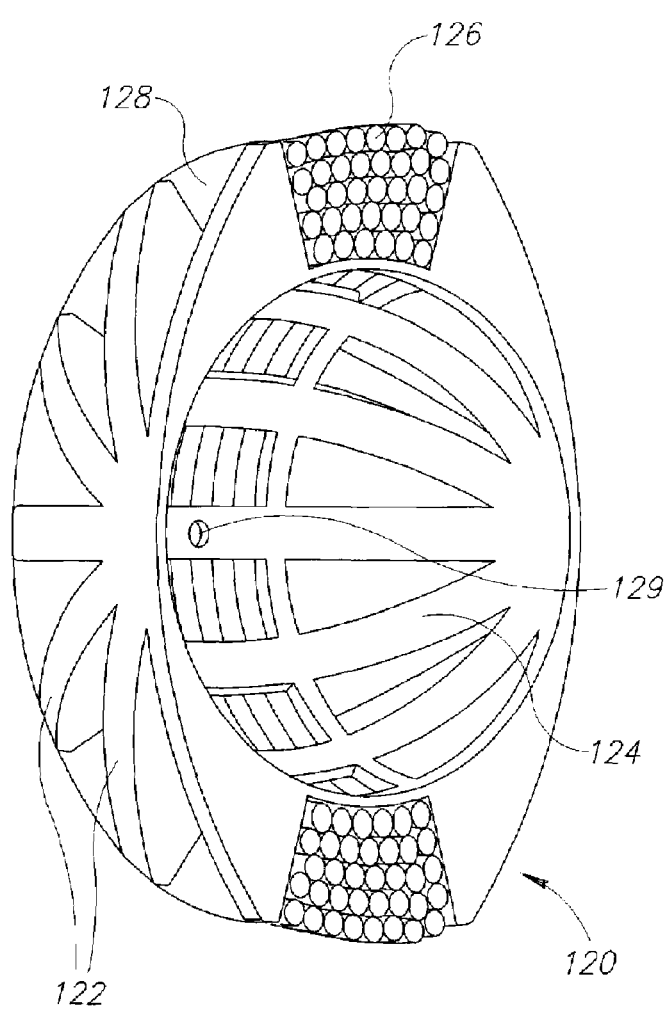
FIGS. 9a-9c illustrate views of a generator with a splayed coil configuration, solid sidewalls and finned support, and a finned inner surface, according to an exemplary embodiment of the invention.
Figure 9B:
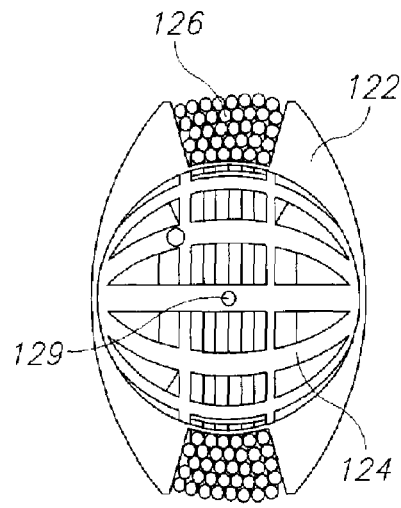
Figure 9C:
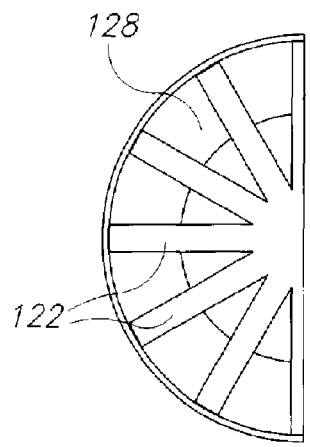

FIGS. 9a-9c illustrate views of a generator stator 120 with a splayed-coil configuration. The stator bobbin includes solid sidewalls 128 and fins 132 as support to use the sidewall as a heat transfer surface, and a finned inner surface 124. The generator stator 120 can be used with a rotor (not shown) as an air moving device. In this embodiment, the materials and processes used can be the same or substantially the same as those described above. Holes 129 are provided for a shaft for the rotor. The magnet of the rotor is magnetized in such a manner that a plane defining the pole boundary of the magnet a plane drawn through the centerline of the corresponding coil 126 at some point during a 360 degree rotation of the rotor.

Figure 10A:
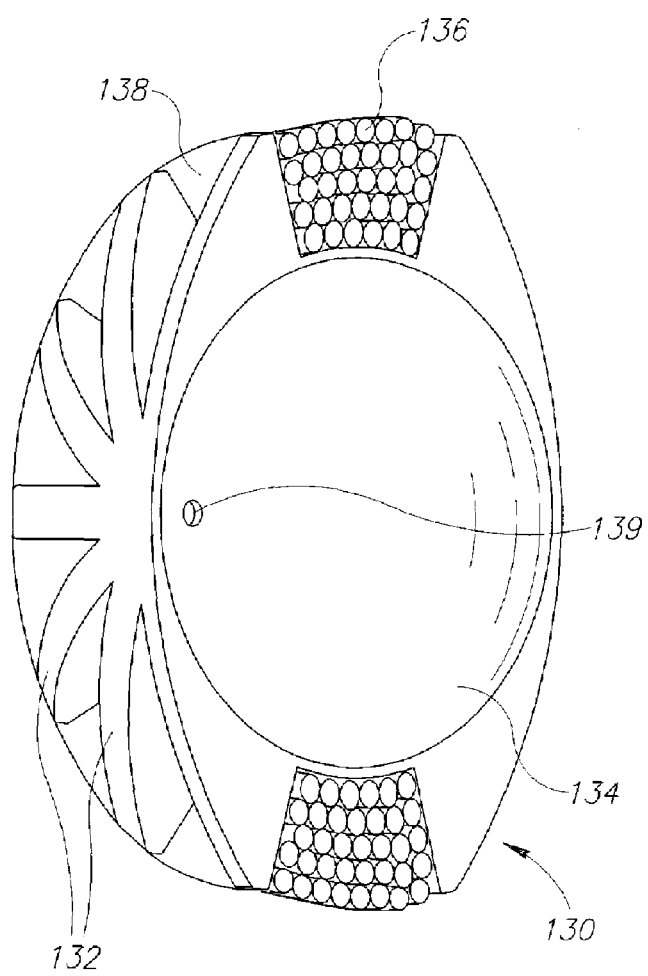
FIGS. 10a-10c illustrate views of a generator with a splayed coil configuration, solid side walls and finned support, and a solid inner surface, according to an exemplary embodiment of the invention.
Figure 10B:
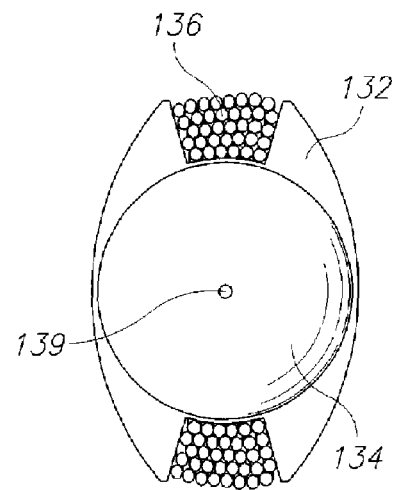
Figure 10C:
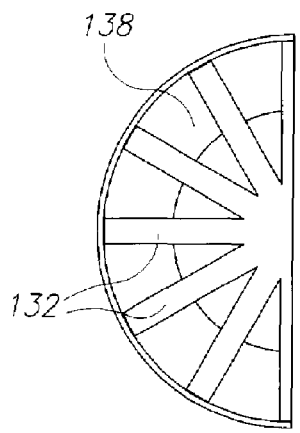

FIGS. 10a-10c illustrate views of a generator stator 130 with a splayed-coil configuration. The stator bobbin includes solid sidewalls 138 and with fins 132 as support to use sidewall as a heat transfer surface, and a solid inner surface 134. In this embodiment, the materials and processes used can be the same or substantially the same as those described above. Holes 139 are provided for a shaft for rotor (not shown). The magnet of the rotor is magnetized in such a manner that a plane defining the pole boundary of the magnet a plane drawn through the centerline of the corresponding coil 136 at some point during a 360 degree rotation of the rotor.

Figures 11A, 11B, 11C:
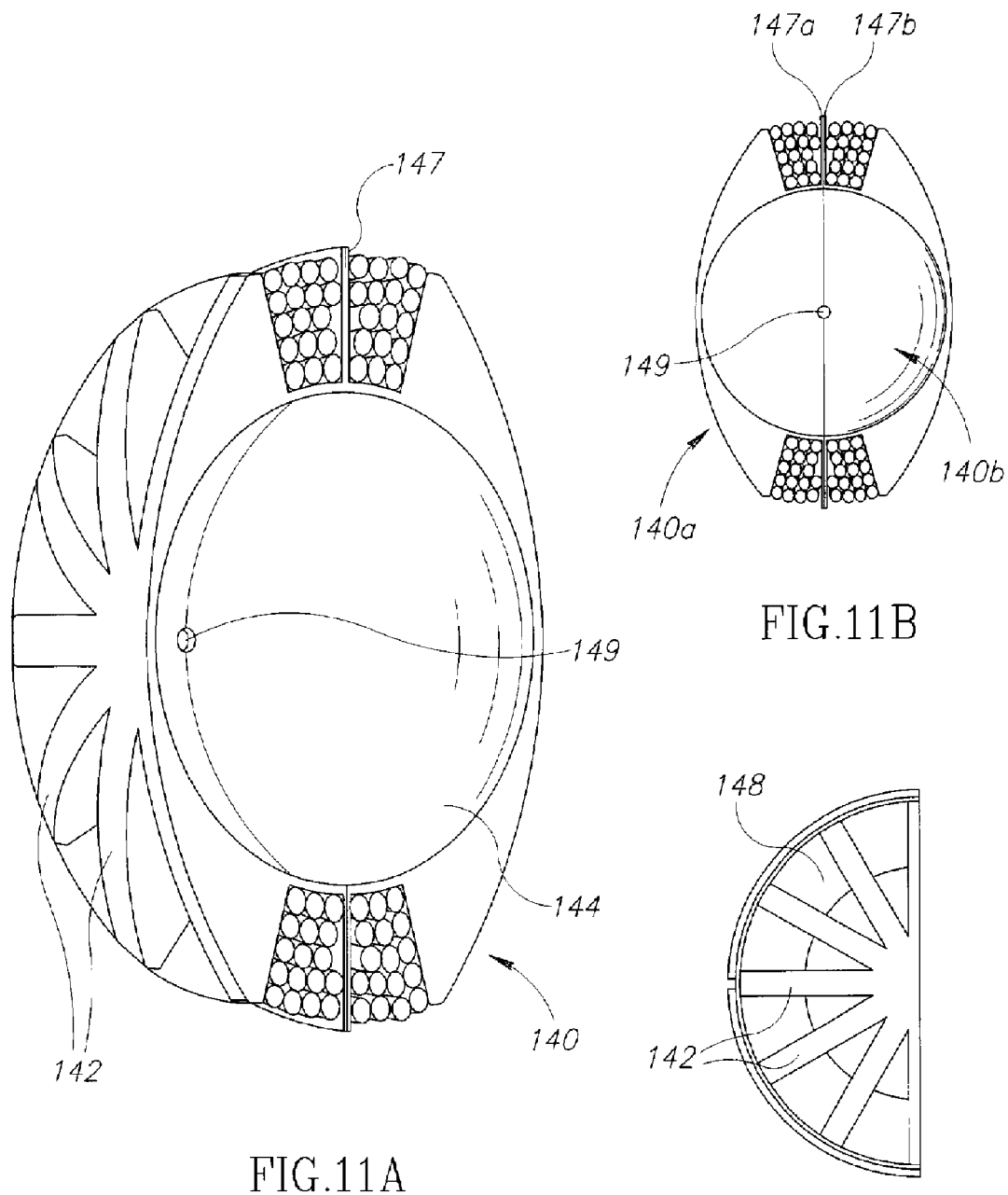
FIGS. 11a-11c illustrate views of a generator in which the bobbin is split longitudinally, according to an exemplary embodiment of the invention.

FIGS. 11a-11c illustrate views of a generator stator 140 with a splayed-coil configuration. The stator bobbin includes solid sidewalls 148 and fins 142, and a solid inner surface 144. The bobbin housing is split longitudinally into portions 140a and 140b and a wall 147 is located along the split. Wall 147 can have a first portion 147a as part of portion 140a and a second portion 147b as part of portion 140b. The embodiments described above with respect to FIGS. 6a-10c can be made with the longitudinal split and/or wall 147 shown in FIGS. 11a-11c. In such embodiments, the winding can be placed on the bobbin prior to assembly with the rotor. The resulting split windings can be wired in series with the direction of current remaining the same in both halves of the winding, or can be controlled independently. Parallel winding is also possible. The connection of the two winding halves can be performed using insert molded termination pads, soldering, mechanical fusion, or any other wiring termination method currently used in industry, for example. Moreover, this form of split bobbin can be assembled without use of the center wall 147 as depicted in FIGS. 11a-11c when the coil is form wound with bondable wire and fused prior to installation on the bobbin or when is wound in place on the bobbin using an external support and bonded or varnish/epoxy impregnated prior to removing the winding supports. For purposes of assembly, it may be necessary that either both bearing supports are split in half, with each bobbin support containing half of each bearing support 149, or each bobbin half contains one complete bearing support 149. In this manner, the winding does not provide mechanical retention of the two bobbin support halves. As a result, a locking feature or mechanical fasteners may be needed that may not have been needed in other embodiments.

Figure 12A:
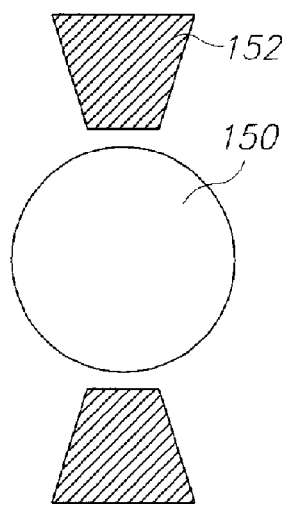
FIGS. 12a-12b illustrate different cross-sectional areas of the splayed coil configuration, according to exemplary embodiment of the invention.
Figure 12B:
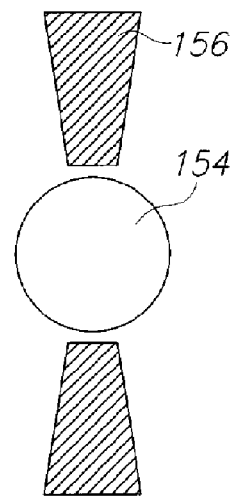

The embodiments described above with respect to FIGS. 6a-11c can have coil splay that is defined by a radial line drawn from the rotor shaft. Alternatively, the coil splay need not be defined by such a radial line. Further, the embodiments can have section areas of the bundled coil or coil winding that can vary along the longitudinal length of the rotor. In such embodiments, the materials and processes used can be the same or substantially the same as those described above. For example, FIGS. 12a-12b illustrate different cross-sectional areas 152 and 156, respectively, of the splayed-coil configuration about different rotor areas 150 and 154, respectively, according to embodiments.

Figure 13A:
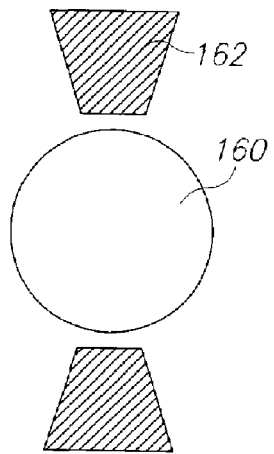
FIGS. 13a-13c illustrate different cross-sectional areas of the splayed coil configuration, according to exemplary embodiment of the invention.
Figure 13B:
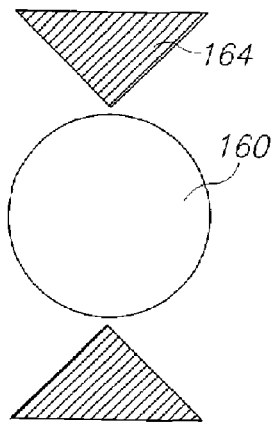
Figure 13C:
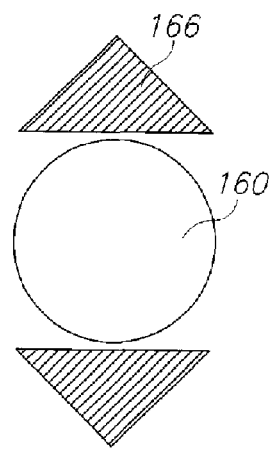
Figure 14A:
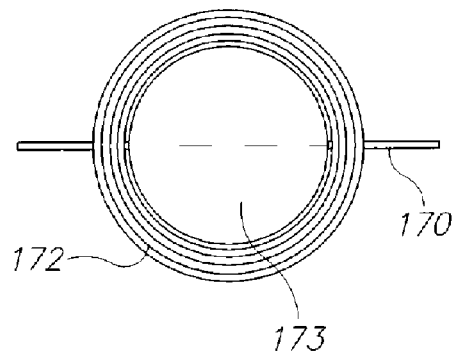
FIGS. 14a-14d illustrate different ellipsoidal shapes of the rotor, according to embodiments.
Figure 14B:
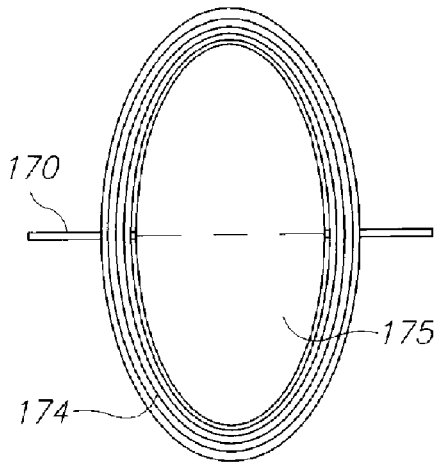
Figure 14C:
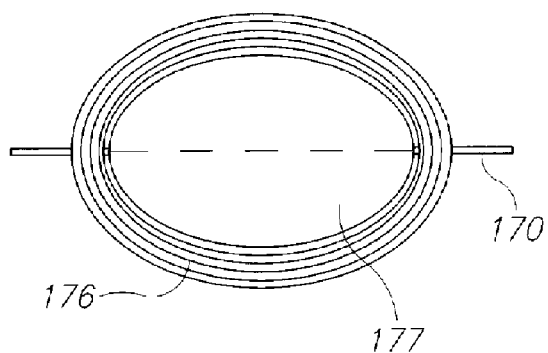
Figure 14D:
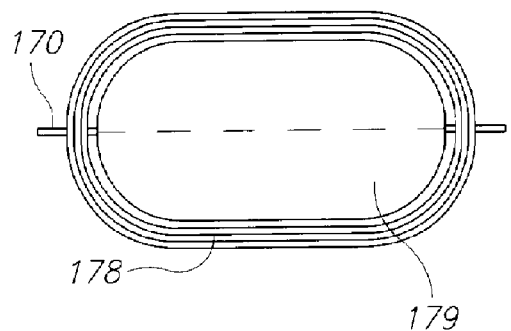

The embodiments described above can have one of multiple cross-sectional areas depending on the objectives of the design that need not be necessarily trapezoidal in shape so long as the sidewalls are not parallel. FIGS. 13a-13c further illustrate different cross-sectional areas 162, 164, and 166 of the splayed-coil configuration, according to embodiments. Moreover, the stator can have one or more curved sidewalls.

FIGS. 14a-14d illustrate different ellipsoidal shapes of the rotors 173, 175, 177, and 179, with corresponding stators 172, 174, 176, and 178. The dotted line is a pole boundary, the shaft 170 sticking out of the ends of the rotor is the rotational axis of the rotor, and the stators are shown shaded.

Figure 15A:
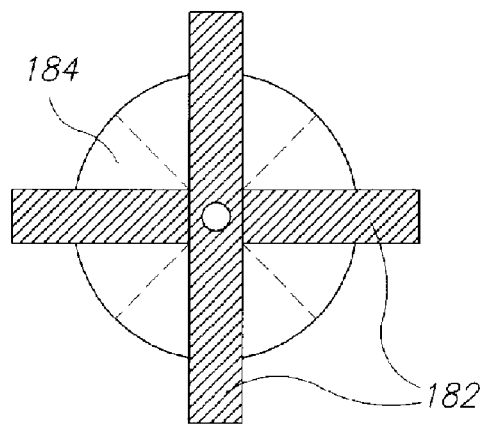
FIGS. 15a-15c illustrate different coil winding configurations for use in higher pole counts designs, according to an exemplary embodiment of the invention.
Figure 15B:
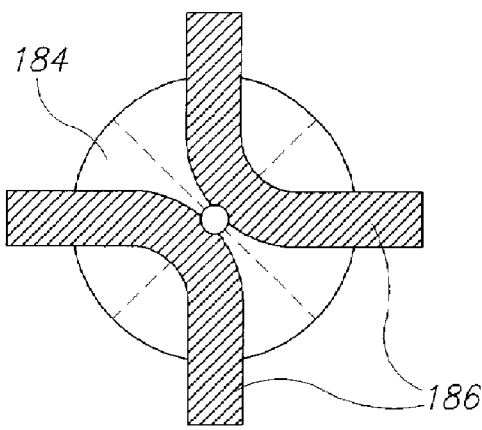
Figure 15C:
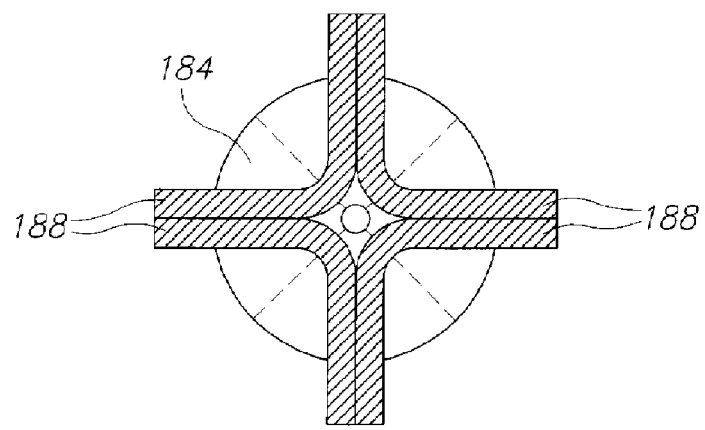

In addition to the two pole designs described above, the generator may be constructed using any even number of magnetic poles in the rotor. FIGS. 15a-15c illustrate different coil winding configurations for use in higher pole counts designs. FIG. 15a has a stator 182 configuration different from those of stators 186 and 188 in FIGS. 15b and 15c, respectively. In these figures, 4-poles are shown in the rotor 184, as viewed from the end of the rotor 184, with dashed lines indicating the pole boundaries. In each of the these winding embodiments, the opposite side of the coil can be either identical to the side shown or can be rotated by one pole angular width, which in the case of 4-poles a one pole angular width is 90 degrees. Winding in a manner that results in an identical configuration as viewed from the opposite side, the embodiment of FIG. 15b can result in a single continuous winding. The embodiments of FIGS. 15a and 15c, however, result in multiple individual coils. The individual coils can be connected in series or parallel, and controlled as a group or independently depending on the requirements of the application. This scheme may be adapted to any even pole count by changing the angle between overlapped coils in FIG. 15a, or by changing the bend angle in the two and four coil bent coil configurations of FIGS. 15b and 15c. As alternatives, the embodiments of FIGS. 15b and 15c can be configured without any of the depicted independent coils as long as at least one coil remains as an electrical conducting member.

As described above, either the rotor or the stator can be the rotating body in a dynamoelectric machine. What is needed is a speed differential between two magnetic/electromagnetic fields to generate a voltage. Thus, either the rotor, or the stator, or both can rotate, so long as there is a speed differential. Moreover, additional rotor or stator elements can be linked together by addition of layers or shells of the rotor or of the stator. For example, both an internal and external rotor can be employed with a stator in between. The linking can also occur through a shaft or magnetic linkage of adjacent similar devices, that is, two devices with the rotors on the same shaft with independent stators, for example.

Figure 16:
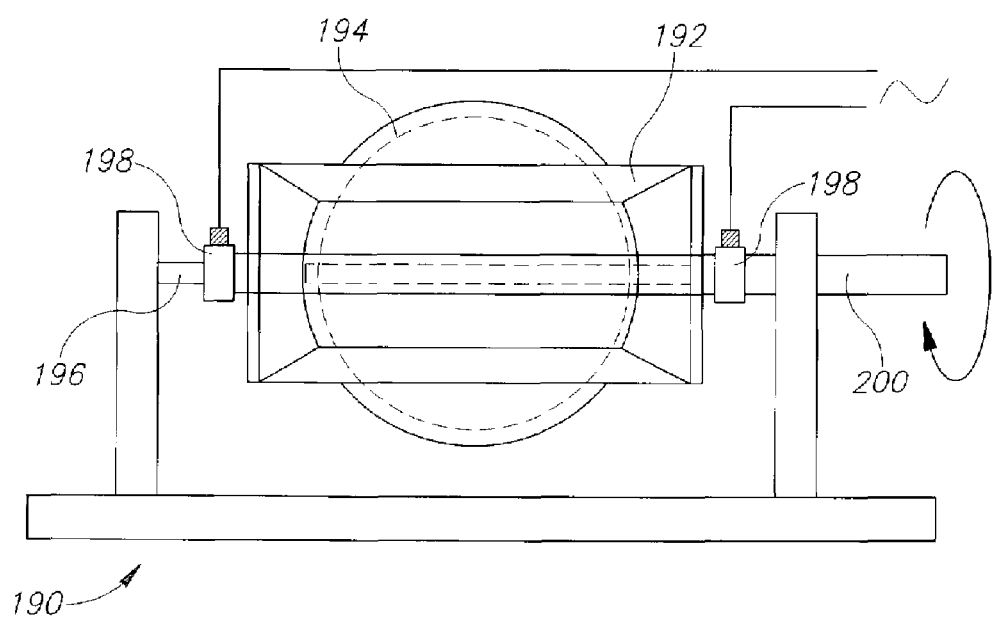
FIG. 16 illustrates a generator with a rotatable stator using a stationary shaft, according to an exemplary embodiment of the invention.
Figure 17:
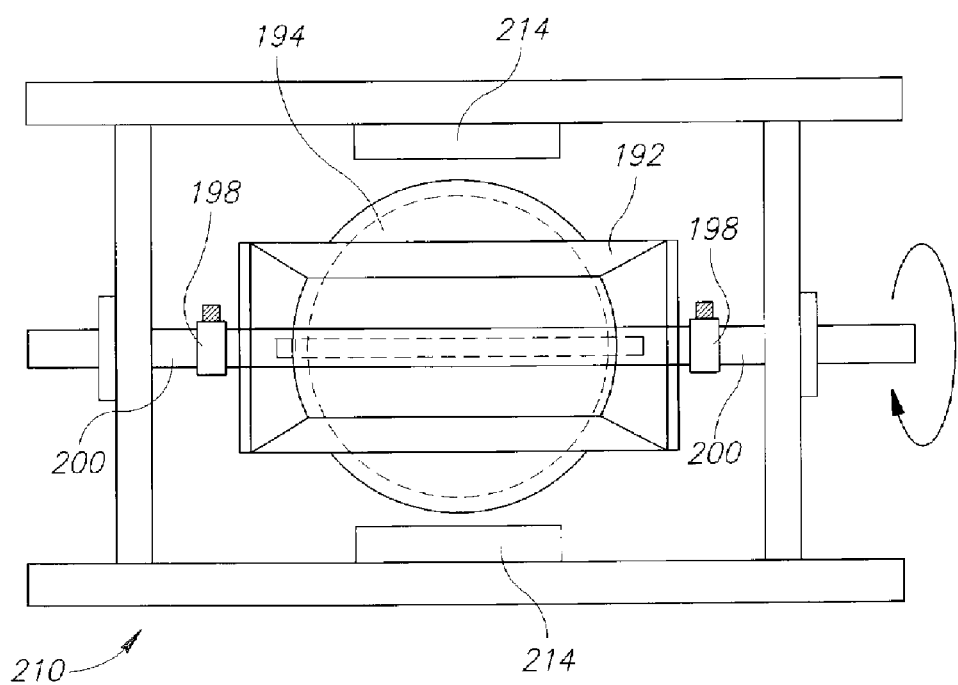
FIG. 17 illustrates a generator with a magnetic coupling of the rotor with iron or a magnet to restrain the rotor from rotation, according to an exemplary embodiment of the invention.

FIGS. 16 and 17, show two variations of rotatable stators. In FIG. 16, dynamoelectric device 190 includes shaft 196 connected to the central magnetic sphere 194 and held stationary by fixing the shaft 196. The coil bobbin of stator 192 is coupled to shaft 200 which is external to and concentric with shaft 196. Rotation of shaft 200 causes stator 192 to rotate about rotor 194, causing a voltage to be generated in the windings of stator 192. The stator 192 is electrically coupled via brushes 198. No brush may be necessary when the dynamoelectric device is a generator and the powered device rotates with the stator 192.

In FIG. 17, dynamoelectric device 210 includes internal concentric shaft 196 and magnetic sphere 194 which are coupled magnetically to iron or magnet 214, rather than mechanically. Again, rotation of shaft 200 causes stator 192 to rotate about rotor 194, causing a voltage to be generated in the windings of stator 192.

Figures 18A, 18B:
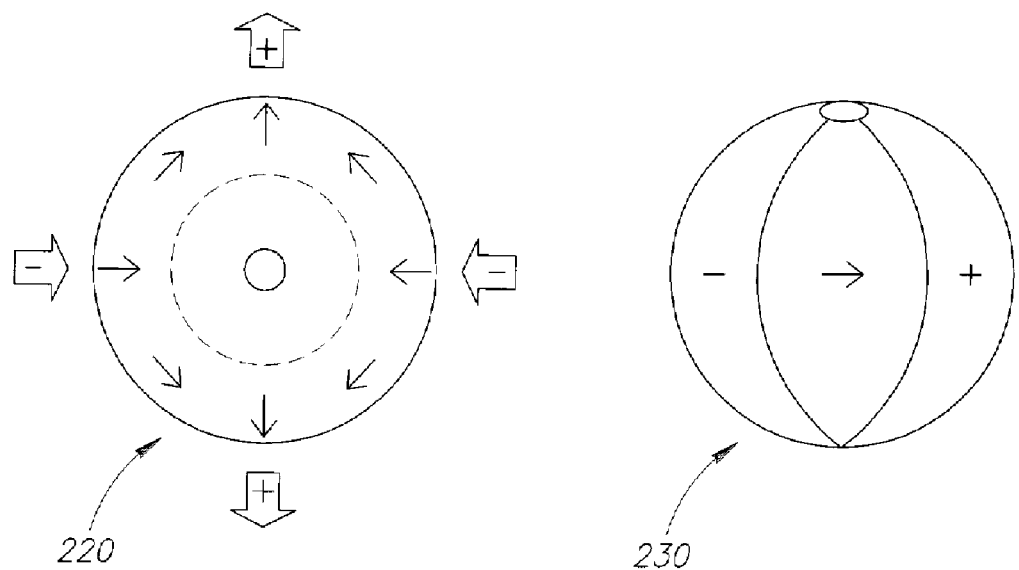
FIGS. 18a-18c illustrate a Halbach array for an internal rotor, including a cross-section of a spherical, external Halbach array with quadrapole fields to generate an external non-uniform magnetic field and no fields in the center of the core, according to an exemplary embodiment of the invention.
Figure 18C:
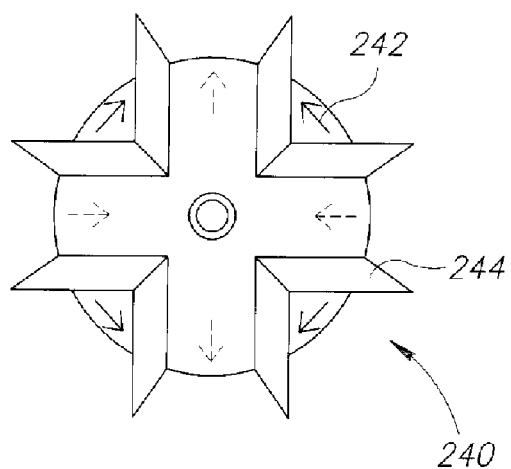

FIGS. 18*a*-18*c* illustrate a Halbach array for an internal rotor, including a cross-section of a spherical, external Halbach array 220 with quadrapole fields to generate an external non-uniform magnetic field and no fields in the center of the core, according to an embodiment. The rotor configuration shown is an alternative embodiment providing any even multiple of poles. This is a well known magnetic structure that can be used in the construction of any of the embodiments described above. The arrows indicate the direction of magnetization. Typically, this construction is formed from multiple magnets, with a minimum of two per pole, which are bonded to some internal form, or edge bonded using an adhesive potentially resulting in a hollow magnet when desirable. The magnets of the rotor Halbach array 220 may be magnetized in such a manner that a plane defining the pole boundary of the magnet corresponds with a plane drawn through the centerline of the corresponding coil at some point during a 360 degree rotation of the rotor or the construction of the Halbach array may allow for a skew in the plane defining the pole boundary relative to the centerline of the corresponding coil bundle. Use of the Halbach array can increase or decrease the peak flux at the centerline of a pole and the corresponding generated voltage for the same mass of magnet material as a rotor constructed as illustrated in FIG. 5. FIG. 18*c* illustrates an unwound bobbin intended for use in a stator wound in one of the methods depicted in FIGS. 15*a*-15*c* matched with a corresponding Halbach array rotor 220.

Figure 19A:
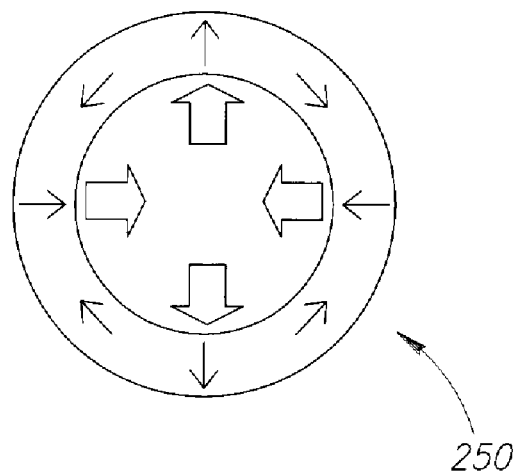
FIGS. 19a-19b illustrate a Halbach array for an external rotor, including a cross-section of a spherical, external Halbach array with quadrapole fields to generate a non-uniform magnetic field and no external fields, according to an exemplary embodiment of the invention.
Figure 19B:
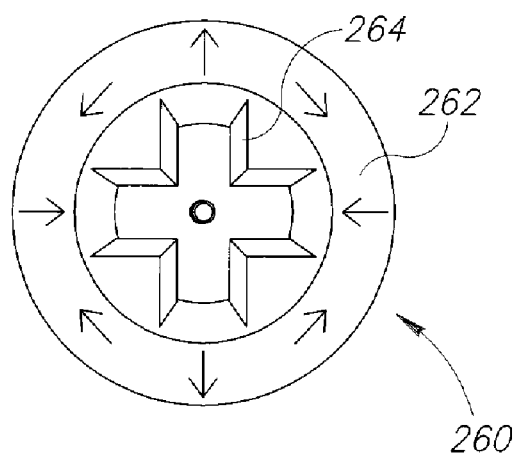

FIGS. 19*a*-19*b* illustrate a Halbach array for an external rotor, including a cross-section of a spherical, external Halbach array 250 with quadrapole fields to generate a non-uniform magnetic field and no external fields, according to an embodiment. In this configuration, a second internal rotor consisting of either an iron ball or a spherical magnet of the same pole count as the external rotor can be used with the external rotor. This configuration can be either mechanically coupled, that is, concentric shafts can be tied together, or can be magnetically coupled. In this configuration, the magnets can be bonded to an external shell, or edge bonded using an adhesive resulting in a hollow sphere. The magnets of the rotor Halbach array 250 may be magnetized in such a manner that a plane defining the pole boundary of the magnet corresponds with a plane drawn through the centerline of the corresponding coil at some point during a 360 degree rotation of the rotor or the construction of the Halbach array may allow for a skew in the plane defining the pole boundary relative to the centerline of the corresponding coil bundle. Use of the Halbach array can increase or decrease the peak flux at the centerline of a pole and the corresponding generated voltage for the same mass of magnet material as a rotor constructed as a hollow sphere of same dimension and magnetized using a uniform magnetizing field during manufacture. FIG. 19*b* illustrates an unwound bobbin intended for use in a stator wound in one of the methods depicted in FIGS. 15*a*-15*c* matched with a corresponding Halbach array rotor 250.

Figure 20:
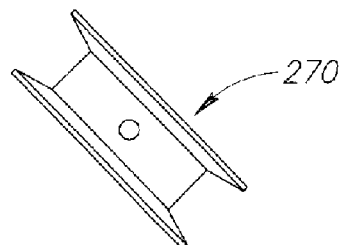
FIGS. 20-22b illustrate various configurations of electromagnets, according to an exemplary embodiment of the invention.
Figure 21A:
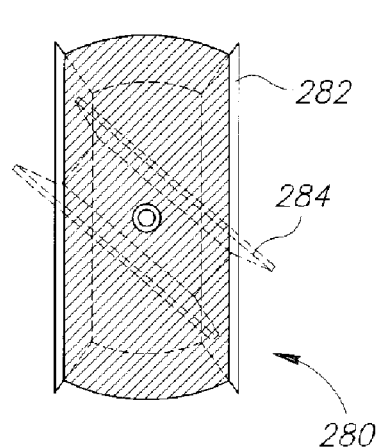
Figure 21B:
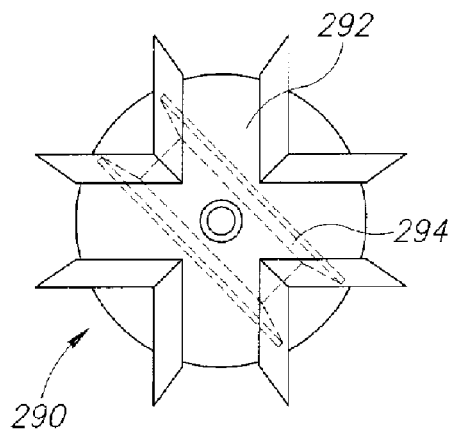
Figure 22A:
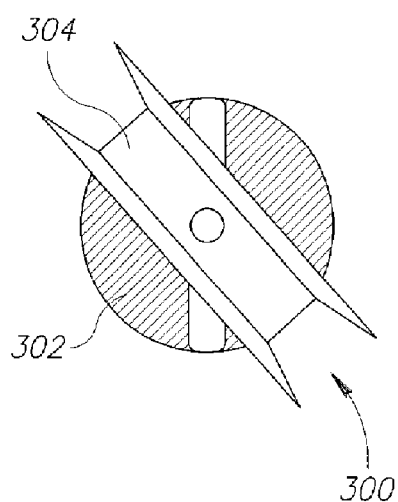
Figure 22B:
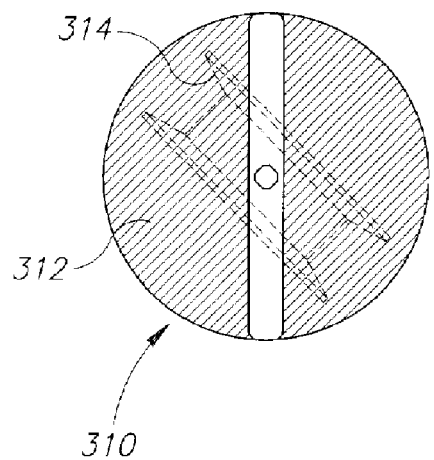

FIGS. 20-22*b* illustrate various embodiments where not only the stator but also the rotor are electromagnetic. FIG. 20 shows a rotor 270 with the rotor coil bundle not shown. The bobbin for rotor 270 causes the rotor coil to be splayed. In all electromagnetic embodiments shown, excitation of the rotor is performed via a brush system (not shown). Excitation may be via a DC source to replicate the field distribution of an equivalent permanent magnet rotor, or may be via an AC source to replicate any desirable waveform output for a given application. FIG. 21*a* shows a generator 280 with an external stator 282 with a stator coil and an internal rotor 284 and FIG. 21*b* shows a generator 290 with an external, four pole stator 292 and an internal rotor 294. In this embodiment, the stator coil must be wound in the manner depicted in FIG. 15*a*. FIG. 22*a* shows a generator 300 with an internal stator 302 and an external rotor 304. In this embodiment, the internal stator 302 is wound in a spherical shape rather than the typical flared toroid in order to maximize the space for turns and distribute them as close as possible to the stator 302 surface. The two resulting electromagnetic poles are to the left and right of the resulting stator coil depicted. FIG. 22*b* shows a generator 310 with an external stator 312 wound on a spherical bobbin with two resulting electromagnetic poles to the left and right of the stator coil depicted and an internal electromagnetic rotor 314.

The electromagnets described can be used in the rotor, the stator, or both, of the embodiments described above with no permanent magnet material associated with the electromagnets. All of the windings of the various components can be splayed. In this type of embodiment, the rotor and the stator pole counts need not match as they can be energized and de-energized in whatever fashion is most suitable for the configuration. In the embodiment of FIG. 21*b*, the stator bobbin must be wound in a fashion where the wire is wound directly across the crossover point rather than in a 90 degree bend because of the unequal number of stator and rotor poles (see FIG. 15*a* in which opposite electrical poles are wound together). This winding configuration allows for two independently controlled stator coils wound on the same bobbin. In this embodiment, the two opposing stator poles for each coil, separated from one another by 180 mechanical degrees, are excited simultaneously by the two opposing rotor poles. For a DC excited rotor, this results in a waveform output for each of the independent stator coils equivalent to an analogous two pole permanent magnet rotor machine. This unequal pole design may also be used with permanent magnet designs so long as opposite poles are wound together in the fashion depicted in FIG. 15*a*, independently of other pole pairs (no serially wound coil windings), and are independently controlled from other pole pairs. Additional embodiments include a like number of stator and rotor poles wound in the fashion depicted in FIGS. 15*a*-*c*. In these embodiments, the independently wound pole pairs may be serially wound in order to increase the effective turn count of the stator or rotor coil, or parallel wound to increase the current carrying capacity of the coil.

The embodiments described above have been for single phase designs. However, polyphasic configurations are also possible. In one embodiment, multiple complete assemblies can be constructed with the rotors magnetically aligned with one another using a common shaft or magnetically coupled to one another, and with the stators offset from one another by the electrical angle equivalent to 360 electrical degrees divided by the number of desired phases. For a 3-phase design, for example, the electrical angle would be 360 degrees/3=120 degrees. It is important to note that this is an electrical angle and not a mechanical angle. To obtain the mechanical angle, the pole count must be taken into account. The general equation for the mechanical rotation of the adjacent stators is the following:

Rotation angle=$(360/(p/2))/\phi$, where the magnetic poles is noted by p and the number of phases by $\phi$.

Figure 23:
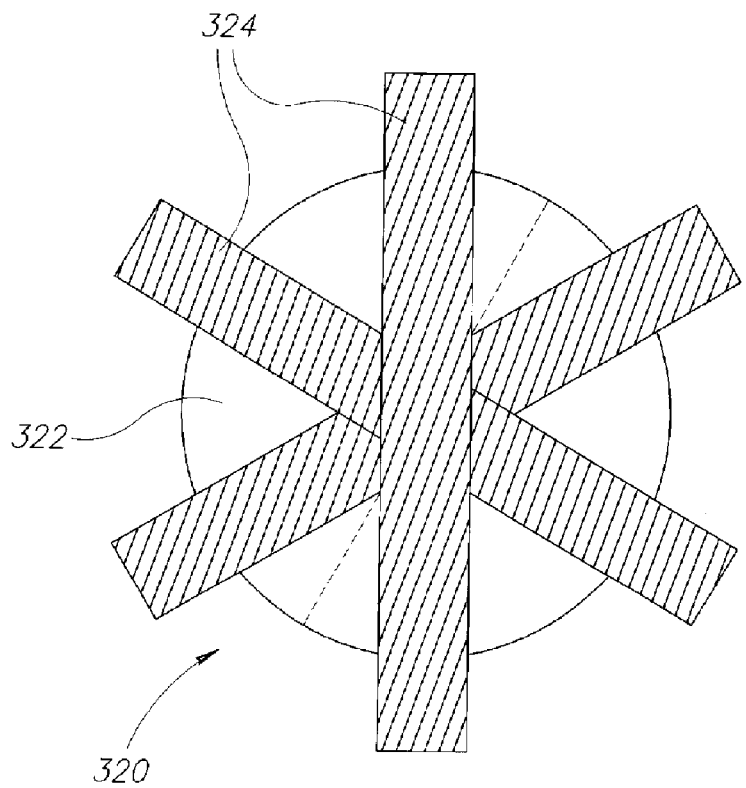
FIG. 23 illustrates a polyphasic configuration, according to an exemplary embodiment of the invention.

A slightly more complicated embodiment is to construct multiple coils in the same assembly with a single rotor. FIG. 23 shows an implementation of such an embodiment for a two-pole device. Each phase has an individual splayed winding 324 offset within the stator by the angle described above in the "rotation angle" equation.

In general, the resulting polyphasic winding using either of the approaches described above can be connected using conventional methodologies for polyphasic machines as individual 2 lead phases, with a central "Y" connection, or additionally, in the case of 3-phase winding, in a "Δ" connection scheme. It may also be possible, for phase counts higher than 3, to connect in a configuration equivalent to the "Δ".

Figure 24:
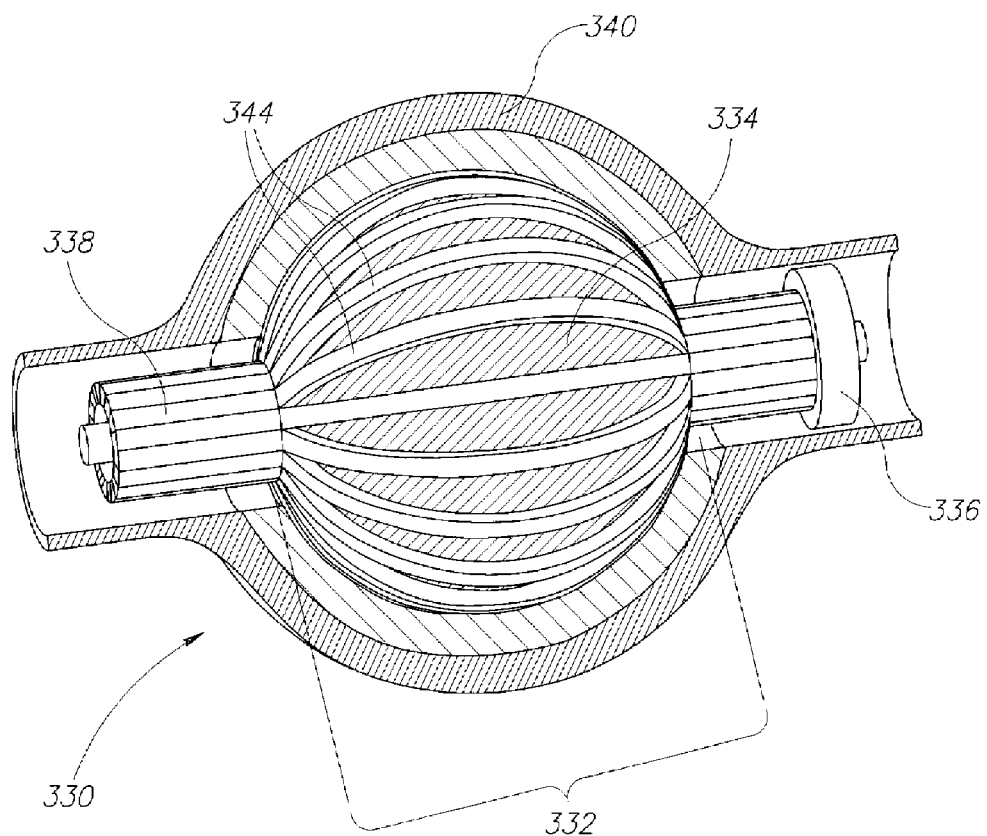
FIG. 24 illustrates a fractional turn stator, according to an exemplary embodiment of the invention.

In addition to the embodiments described above, a fractional turn stator configuration can also be used. FIG. 24 illustrates such a fractional turn stator 338 in which an increased phase capability is provided by creating a star terminated stator configuration where each phase is a one half (½) turn winding terminating on the opposite side of the machine via a shorting ring 336. Such an approach can reduce voltage ripple in rectified circuits due to the high phase count, can provide high speed capability at lower terminal voltage, and can result in extremely high phase count, which may be limited only by physical space.

At least one member of the inner rotor 334 and outer rotor 340 in FIG. 24 can include permanent magnets. When both the inner 334 and outer 340 rotors have permanent magnets, an improved flux density may result. The outer rotor 340 can be made in two halves and can be affixed over the stator onto bushings or bearings on the stator. Alternatively, the outer rotor 340 can be supported directly on the shaft of the inner rotor when the system is such as to provide sufficient stiffness. In one embodiment, the stator conductors 344 can be cast or formed copper conductors. In this embodiment, the copper conductors may be self supporting with no additional mechanical support in the working section 332 of the conductor (depicted in FIG. 24). When the generator with the fractional turn stator is used at high speed, multiple parallel conductors of thin cross section as in Litz wire, or multiple flat bonded conductors may be needed to reduce eddy current losses to an acceptable level. In embodiments requiring multiple parallel conductors, they may be bonded in a fashion to make them self supporting (as with a bondable overcoat or high strength impregnating material such as an epoxy), or may require a supporting coil bobbin as discussed in earlier embodiments (not shown). In the simplest embodiment, conductors for each of the fractional turns are terminated at one end in a "Y" configuration using a shorting ring 336 at one end of the stator. As an alternative to the "Y" shorting ring approach for fractional turns, the conductors can be connected in such a manner that single or multiple complete turns are formed by welding, soldering, bolting, or forming jumper conductors on one or both ends of the stator to connect ½ turns in a manner matching the desired phase and turn counts (not shown).

It is not necessary to include both inner rotor 334 and outer rotor 340. Thus only inner rotor 334 may be employed or only outer rotor 340 may be employed.

In some embodiments, each conductor 344 of stator 338 has a trapezoid cross-section. Alternatively, the cross-section of each conductor 344 can be round, elliptical, rectangular, square, or any other shape.

Figure 25B:
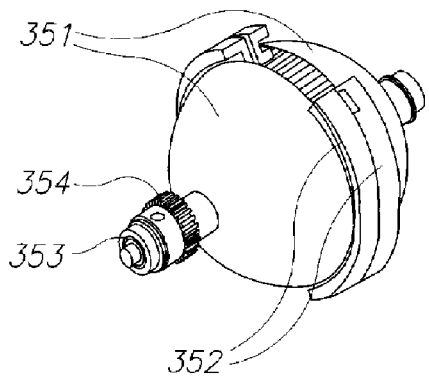
FIG. 25a-b illustrate an alternative external rotor configuration, according to an exemplary embodiment of the invention.
Figure 25A:
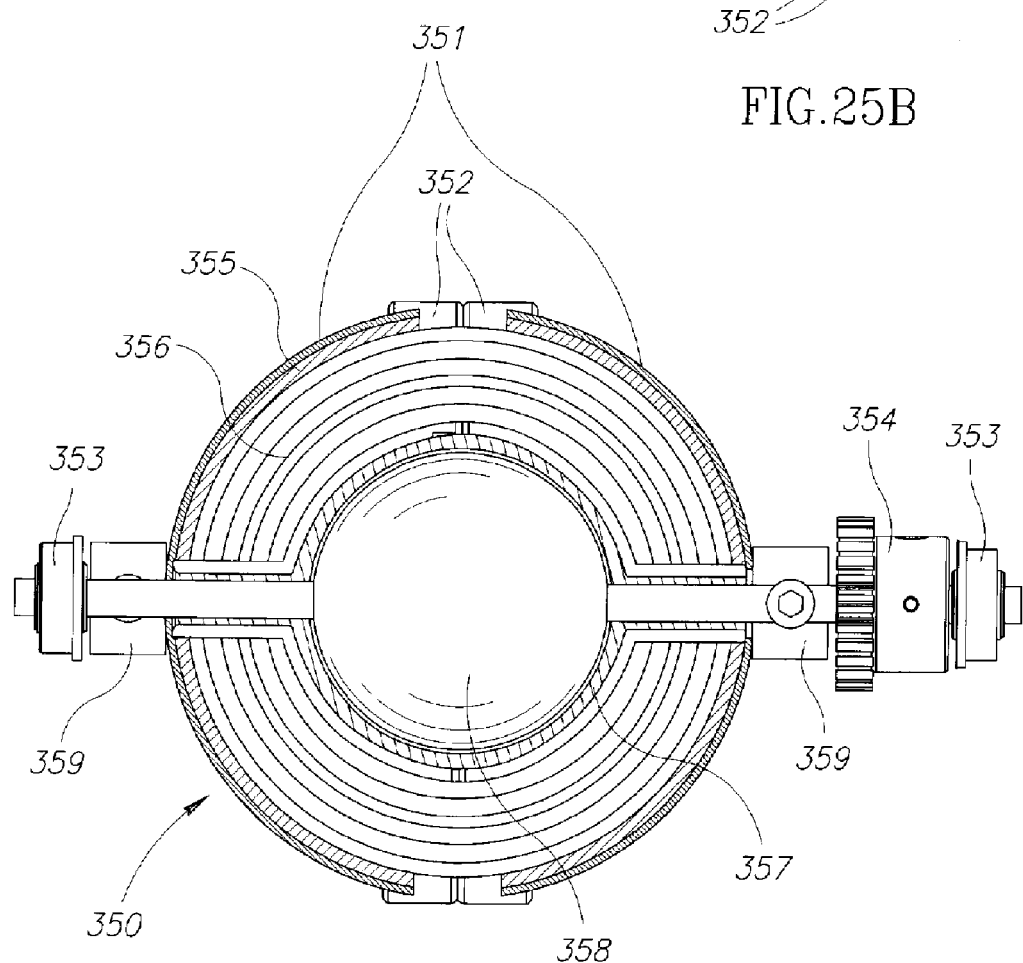

In addition to the embodiment shown in FIG. 24 with an outer rotor 340 which is split lengthwise in a plane which intersects the axis of rotation, it is also possible to construct an assembly with an outer rotor that is split in a plane perpendicular to the axis of rotation. FIGS. 25a-b depict an assembly 350 constructed in this fashion.

In this embodiment, the assembly 350 is constructed by assembling two stator bobbin halves 352 that are split perpendicular to the center axis of the rotor assembly 358 over the rotor, and winding the stator 356 over the assembled stator bobbin halves 352 and rotor 358. The outer rotor halves 351 are then slid over the assembly from each end of the rotor assembly 358 and locked to the rotor assembly 358, In this embodiment, the outer rotor halves 351 are secured to the rotor assembly 358 using a setscrew type shaft collar 359 which is welded or otherwise affixed to the outer rotor halves 351.

The stator bobbin halves 352 are intended to interface with a housing (not depicted) for support of the stator halves 352, provides reaction torque for the assembly 350, and additionally supports the rotor assembly bearings 353. Input power in this embodiment is provided through a drive gear 354.

The embodiments previously described may be used in a number of fashions for the purpose of energy recovery or generation. The following section describes a number of embodiments applying the previously described embodiments specifically for this purpose.

Bicycle and other large-wheeled transport mediums offer an opportunity for use of a large diameter friction disk and small diameter friction rollers for the purpose of achieving a gear reduction to the generator. FIGS. 26a-c and FIGS. 27a-c depict two embodiments of this approach.

Figure 26A:
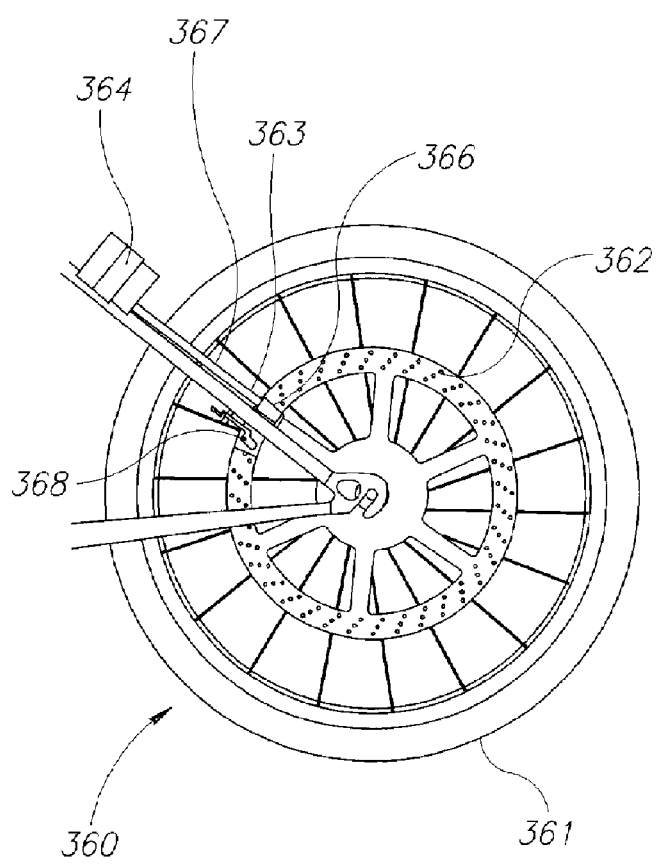
FIGS. 26a-c illustrate a selectively mechanically actuated disk driven wheeled application with flexible shaft drive to generator, according to an exemplary embodiment of the invention.
Figure 26B:
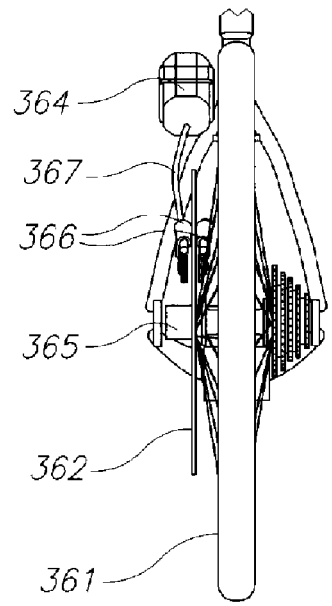
Figure 26C:
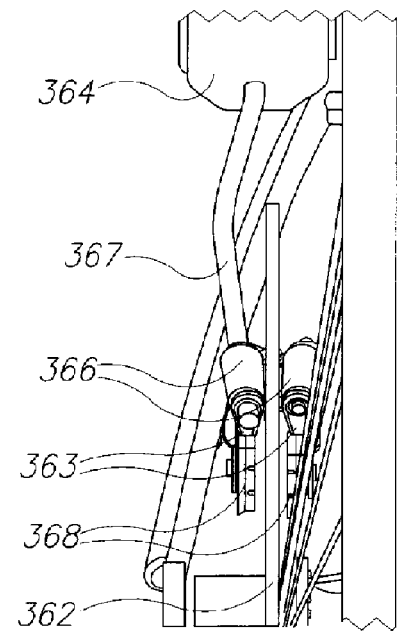

A simple mechanically actuated friction disk system is shown in FIGS. 26a-c. In this embodiment the bicycle generating system 360 is driven by the rear wheel 361 of a bicycle. A friction disk 362 is attached to the hub of the rear wheel 361. Power is extracted from the system 360 by means of a pair of mechanically actuated brake calipers 363 which carry friction rollers 366. One of the friction rollers 366 is coupled via a flexible drive shaft 367 to the input shaft of the generator/energy storage component 364.

In this embodiment, the mechanical caliper 363 is similar to a standard bicycle brake caliper. For purposes of selective engagement of the mechanical caliper 363, a standard bicycle brake cable and selector handle may be added to the system. Alternatively, the mechanical caliper may be closed using the actuation of a collocated mechanical brake 368 through a spring. In either case, it is desirable that the bicycle generating system 360 be engaged with the friction disk 362 for energy recovery prior to the mechanical brake 368.

Figure 27B:
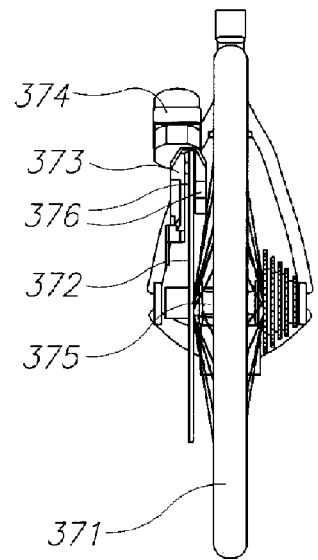
FIGS. 27a-c illustrate a selectively hydraulically actuated disk driven wheeled application, according to an exemplary embodiment of the invention.
Figure 27A:
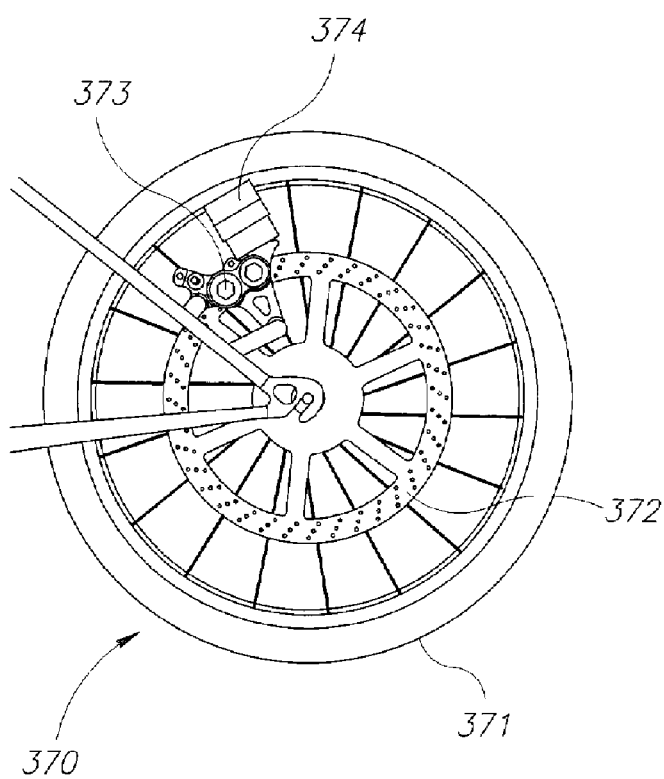
Figure 27C:
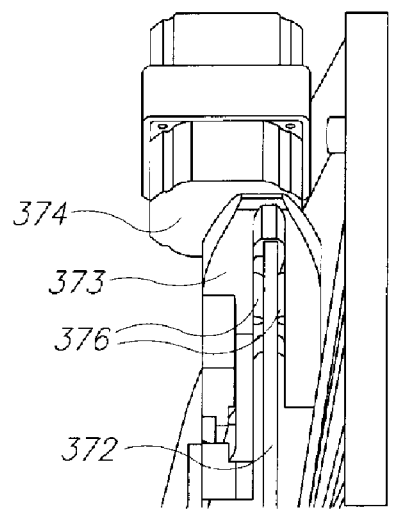

In FIGS. 27a-c an alternative embodiment utilizing a hydraulically actuated caliper is described. For this bicycle the generating system 370 is driven by the rear wheel 371 of a bicycle. A friction disk 372 is attached to the hub 375 of the rear wheel 371. Power is extracted from the system 370 by means of a pair of hydraulic caliper 373 actuated friction rollers 376 and transferred to a close coupled generator and energy storage component 374 through a gear reduced shaft drive (not shown).

In this embodiment, the hydraulic caliper 373 is of a four piston design with one pair of opposing pistons driving the standard brake pads, and the other pair driving a pair of opposing pistons driving shuttles carrying the friction rollers 376. The hydraulic caliper 373 is designed such that the friction rollers 376 contact the friction disk 372 prior to the standard brake pads for the purpose of regenerative braking or drag braking for training purposes.

As the braking pressure increases, the pressure between the friction rollers 376 and the friction disk 372 increases allowing a higher torque transmission capability. Additionally, a control circuit may be added to control the generating torque of the generator and energy storage component 374 as a function of the hydraulic pressure. This would be a pulse width modulation or similar variable current or voltage control circuit.

Figure 28A:
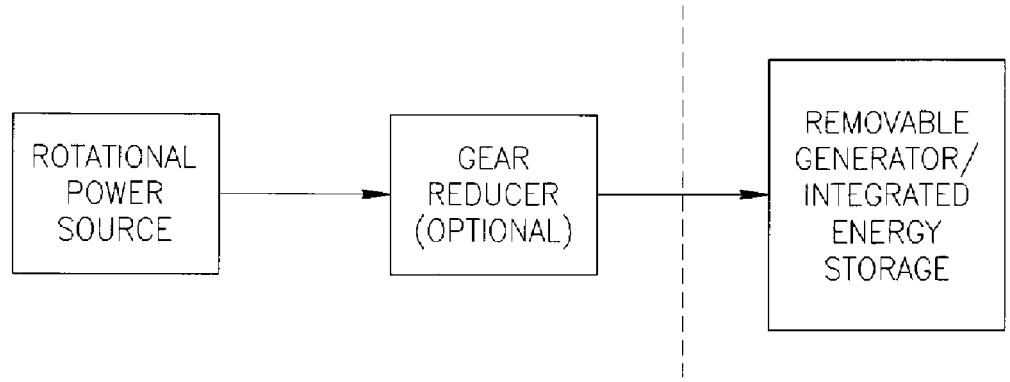
FIGS. 28a-b illustrate power flow diagrams in application, according to an exemplary embodiment of the invention.
Figure 28B:
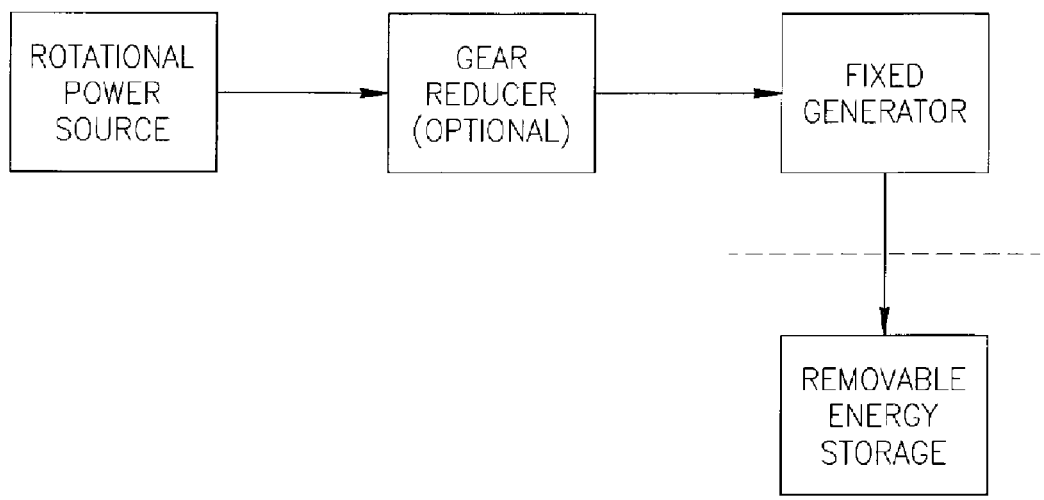

In some applications it is desirable to connect a generator to a wheel or other power input by direct shaft connection, or through gear reduction as opposed to the friction drive previously described. In a large number of these applications it is desirable to store the energy produced, and transport that energy to some other application. FIGS. 28a-b give example power flow diagrams for these applications.

In FIG. 28a, an embodiment is described wherein power is input to the system by rotational means and then transferred into stored energy via a generator/energy storage system. In this application, the generator and energy storage form an integrated system which is removable from the system depicted for use in another system. This could be a similar system with an ability to generate stored energy, or it could be for use with some end-device that only consumes the stored energy.

An example application would be removal of the generator/energy storage from a bicycle system for the purpose of charging a cellular phone or personal electronic device. Alternatively, the generator/energy storage component could be removed and installed in a separate system such as a pushcart for additional energy production and storage. In this scheme, one generator/energy storage component can service multiple energy sources, and loads. One exemplary embodiment is an ellipsoid generator used with a battery pack and charge controller, this concept may be extended to any generator and energy storage system whether electric, hydraulic, pneumatic, or other.

The power flow diagram depicted in FIG. 28b is similar to that of FIG. 28a with the exception that the generator and energy storage components are discrete from one another, and the generator is not removable from the system. In this type of system either a separate generating component is required at each system in which the energy storage component will be used or the energy storage component will only be capable of discharging its energy once removed from the original system.

An example of the system depicted by FIG. 28b would be a generator and energy storage system that are embedded within a pushcart for the purpose of energy recovery. Following use, the operator may remove the energy storage component for use in a similar device, or simply use the recovered energy within the energy storage component remote from the original generating source. In applications where a period of motion that allows charging is followed by a period of inactivity, the ability to remove the energy storage component outside the original system is highly desirable. Like the previously described system of FIG. 28a, this concept is applicable to any generator and energy storage system.

Figure 29A:
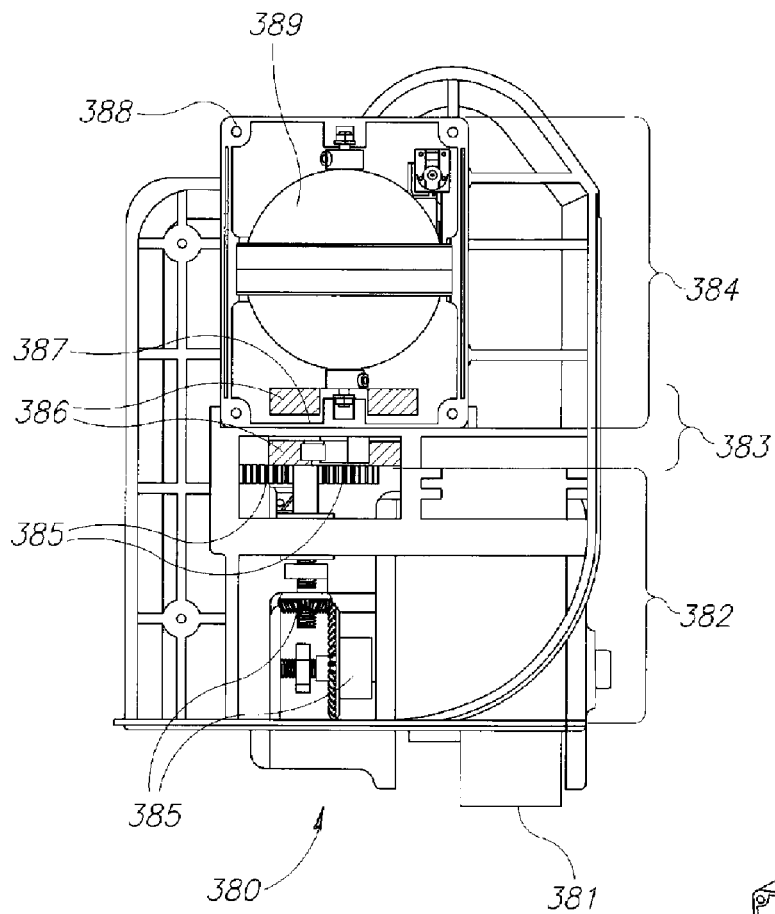
FIGS. 29a-b illustrate a human powered wheeled application with removable generator/energy storage component, according to an exemplary embodiment of the invention.
Figure 29B:
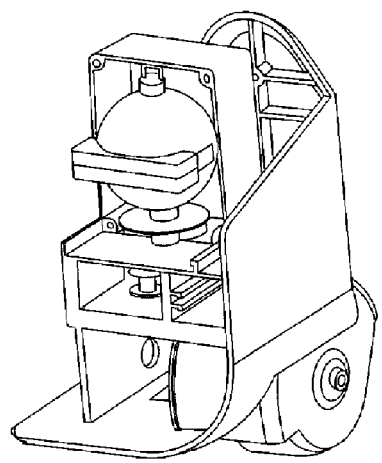

In FIGS. 29a-b, an exemplary system of the power flow diagram described in FIG. 28a is depicted. In this embodiment the assembly 380 is a corner wheel for some human powered form of conveyance such as a pushcart, luggage, furniture dolly, or other. Power is input to the system by a drive wheel 381 and transferred to a generator 389 contained in a generator/energy storage component 384. This is achieved through a gear reducer 382 attached to a magnetic coupler 383. Alternatively, the gear reducer 382 could be eliminated with the magnetic coupler 383 attached to the drive wheel 381.

The magnetic coupler 383 includes two magnet disks 386 separated by an air gap 387. In this embodiment, the generator/energy storage component case 388 passes through the air gap 387 of the magnetic coupler 383. This allows the generator/energy storage component 384 to be removed from the assembly 380 without breaking mechanical or electrical connections.

Although the preferred embodiment utilizes a magnetic coupler 383 for the purpose of connecting the generator 389 to the output of gear reducer 382, due to its elimination of mechanical interface penetrations to the case 388, a similar effect could be achieved by providing a mechanical coupling outside the generator/energy storage component case 388 for attachment directly to the gear reducer 382.

Figure 30A:
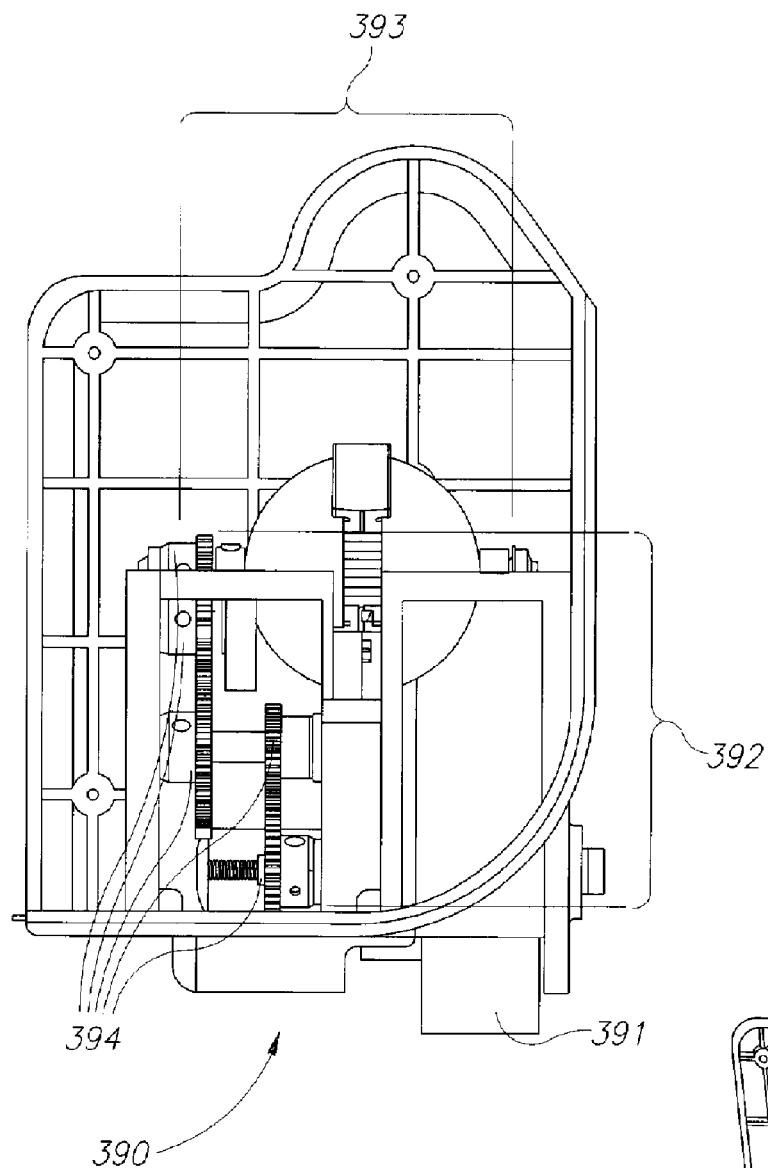
FIGS. 30a-b illustrate a human powered wheeled application with removable energy storage component, according to an exemplary embodiment of the invention.
Figure 30B:
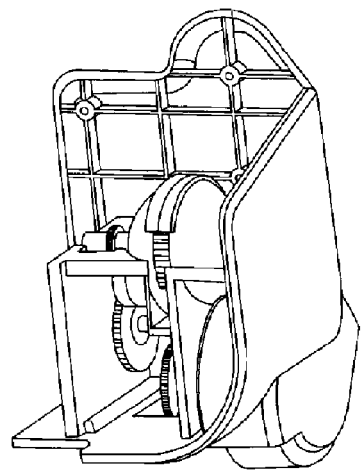

The approach of energy storage component removal discussed in FIG. 28b is addressed in FIGS. 30a-b. In this embodiment the assembly 390 is also a corner wheel for some human powered form of conveyance such as a pushcart, luggage, furniture dolly, or other. Power is input to the system by a drive wheel 391 and transferred to a generator 393 through a gear reducer 392.

In this embodiment, the generator 393 is permanently attached within the assembly 390 and cannot be removed. Output of the generator 393 is passed to an external energy storage component through a wire with a quick disconnection method. This allows mobile use of the energy storage component independent of the assembly 390.

Figure 31:
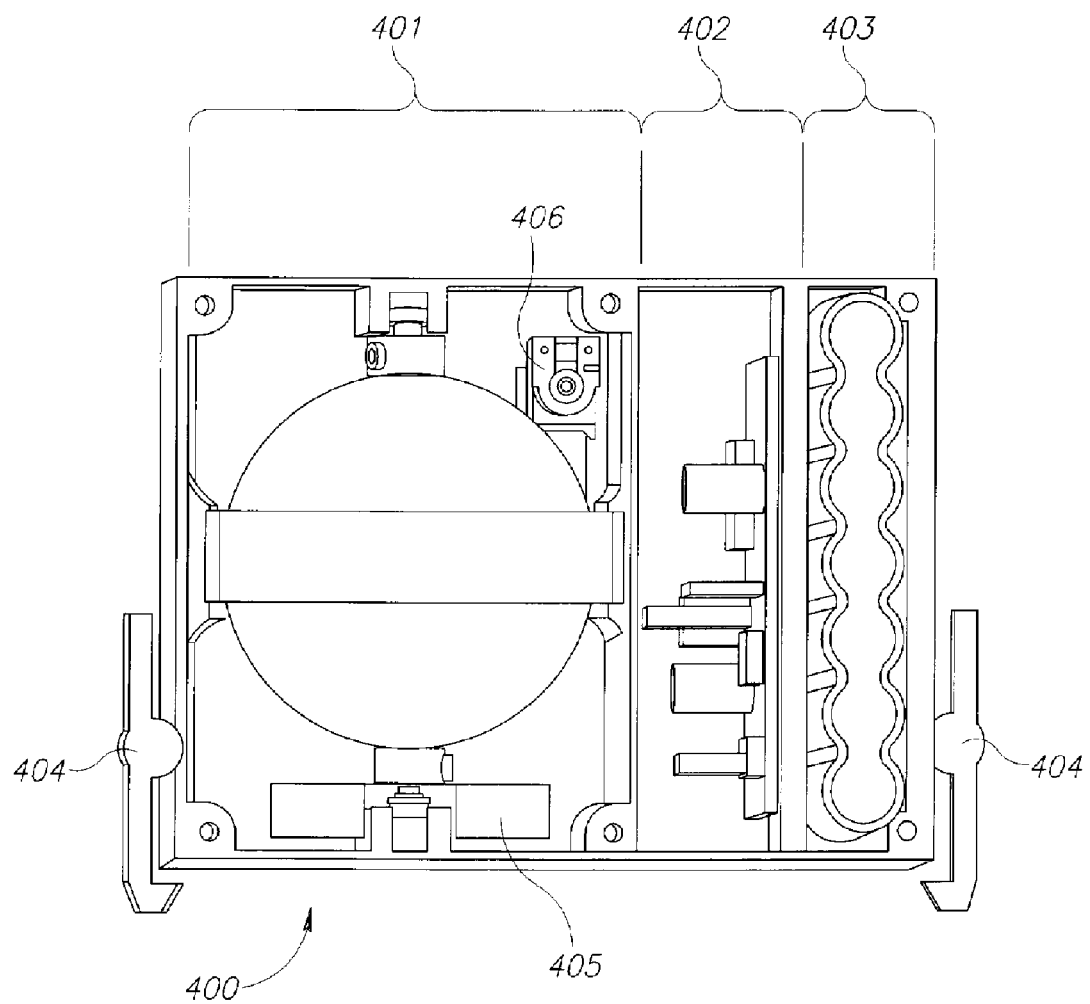
FIG. 31 illustrates a removable human powered wheeled application, according to an exemplary embodiment of the invention.

A further clarification of the removable generator and energy storage depicted in FIG. 28a, and FIGS. 29a-b is shown in FIG. 31. In this embodiment, the generator/energy storage system 400 consists of a generator 401, power conditioning circuit 402, and energy storage 403 that are connected to a powering system using latches 404 and a magnetic coupling 405 for power transmission. Electrical output from the generator/energy storage system 400 is achieved through a power port 406. The power conditioning circuit 402 and energy storage 403 can be designed to support any reasonable voltage for personal electronics to include cellular telephones, personal digital assistants, and netbook or notebook computers.

Alternatively the power conditioning circuit 402 may be designed in such a fashion to allow a user-selectable voltage output. In addition to charging by the generator 401, the power conditioning circuit 402 can be designed to charge the energy storage 403 using an off-board source such as a building mains current, or external DC source.

The primary motivation for a removable generator/energy storage system 400 from the larger system is to allow its use in a more portable fashion when power is not being produced by the larger system or to use a single generator/energy storage system 400 in multiple larger systems. An example of this would be in use in luggage. This removable generator/energy storage system 400 would allow use of the stored energy in energy storage 403 while a passenger is seated in an aircraft while the larger system is stowed in the overhead of the aircraft or in the hold of the aircraft. Alternatively, the generator/energy storage system 400 could be used in a handheld generating system while the passenger is seated for further power production.

An alternative embodiment would connect the power conditioning circuit 402 and energy storage 403 in a single removable compartment with the generator 401 connected to this assembly through a disconnectable wired connection. This alternative embodiment would allow removal of the power conditioning circuit 402 and energy storage 403 for use independent of the generator 401. This embodiment would be useful in designs where there is no desire to use the generator 401 in multiple larger systems, but portability of the power conditioning circuit 402 and energy storage 403 is desired.

The various embodiments described above have been presented by way of example, and not limitation. It will be apparent to persons skilled in the art(s) that various changes in form and detail can be made therein without departing from the spirit and scope of the disclosure, In fact, after reading the above description, it will be apparent to one skilled in the relevant art(s) how to implement alternative embodiments. Thus, the disclosure should not be limited by any of the above-described exemplary embodiments.

In addition, it should be understood that the figures are presented for example purposes only. The structures provided in the disclosure are sufficiently flexible and configurable, such that they may be formed and/or utilized in ways other than those shown in the accompanying figures.

What is claimed is:

1. A device, comprising:
   a rotor;
   a bobbin-type stator surrounding an outer circumference of the rotor; and
   a coil wound around the stator to surround the outer circumference of the rotor;
   the stator comprising a coil support structure including at least one wall arranged adjacent to the coil on one side of a center of the coil and at least another wall arranged adjacent to the coil on another side of the center of the coil, the at least one wall and the at least another wall defining a shape of the coil in a direction away from a center of the rotor, wherein the at least one wall on the one side is neither substantially parallel nor substantially perpendicular to the at least another wall on the another side.

2. The device of claim 1, wherein the stator defines a cavity in which the rotor is disposed, wherein the stator supports the rotor for rotation about the axis.

3. The device of claim 1, wherein the rotor includes a plurality of magnetic poles.

4. The device of claim 1, wherein the coil support structure includes a housing surrounding the rotor with a substantially solid cavity wall.

5. The device of claim 1, wherein the coil support structure includes a housing having a plurality of fins that define one side edge and a plurality of fins that define another side edge.

6. The device of claim 1, wherein a first one of the walls defines one side edge and a second one of the walls defines another side edge.

7. The device of claim 6, wherein the coil support structure includes a plurality of fins integrally made with the first wall and a plurality of fins integrally made with the second wall.

8. The device of claim 6, wherein the first wall and the second wall are both solid walls.

9. The device of claim 1, wherein a space for the coil in the coil support structure is narrower radially inwardly than radially outwardly.

10. The device of claim 1, wherein the coil support structure is made of two complementary members, a first member from the two complementary members includes one side edge and a second member from the two complementary members includes another side edge.

11. The device of claim 10, wherein the coil support structure includes a wall that divides the coil support structure, a first portion of the wall being associated with the first member from the two complementary members and a second portion of the wall being associated with the second member from the two complementary members.

12. The device of claim 1, wherein:
   the rotor includes a plurality of magnetic poles even in number, and
   the coil support structure defines a first path for the coil and a second path for the coil different from the first path, the second path having a first beveled side and a second beveled side and located about an outer perimeter of the cavity.

13. The device of claim 12, wherein an electrical conductor of the coil wound within the first path and an electrical conductor of the coil wound within the second path are a single electrical conductor.

14. The device of claim 1, wherein the rotor is an ellipsoidal rotor.

15. The device of claim 1, wherein the stator is an ironless stator.

16. The device of claim 1, wherein the coil support structure is made of a glass-filled epoxy, or a glass-filled plastic, or a mineral-filled epoxy, or a mineral-filled plastic, or a combination thereof.

17. The device of claim 1, wherein the rotor includes a spherical magnet.

18. The device of claim 17, wherein the rotor includes a supporting shaft for rotation about the axis.

19. The device of claim 1, wherein the coil support structure includes a housing surrounding the rotor with a plurality of fins.

20. A device, comprising:
   a rotor;
   a bobbin-type stator surrounding an outer circumference of the rotor; and
   a coil wound around the stator to surround an outer circumference of the rotor, the coil forming an interior surface near the rotor and an exterior surface facing out of the device;
   wherein said stator comprises a coil support structure guiding the coil that is designed to enlarge the size of the exterior surface of the coil relative to the size of the interior surface of the coil, the coil support structure including at least one wall arranged adjacent to the coil on one side of a center of the coil and at least another wall arranged adjacent to the coil on another side of the center of the coil, the at least one wall and the at least another wall defining a shape of the coil in a direction away from a center of the rotor, wherein the at least one wall on the one side is neither substantially parallel nor substantially perpendicular to the at least another wall on the another side.

* * * * *